US012148605B2

(12) United States Patent
Belov et al.

(10) Patent No.: US 12,148,605 B2
(45) Date of Patent: Nov. 19, 2024

(54) INTERFERENCE SUPPRESSION IN MASS SPECTROMETER

(71) Applicant: Thermo Fisher Scientific (Bremen) GmbH, Bremen (DE)

(72) Inventors: Mikhail Belov, Bremen (DE); Lothar Rottman, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 120 days.

(21) Appl. No.: 17/441,857

(22) PCT Filed: Mar. 26, 2020

(86) PCT No.: PCT/EP2020/058615
§ 371 (c)(1),
(2) Date: Sep. 22, 2021

(87) PCT Pub. No.: WO2020/193726
PCT Pub. Date: Oct. 1, 2020

(65) Prior Publication Data
US 2022/0181130 A1 Jun. 9, 2022

(30) Foreign Application Priority Data
Mar. 26, 2019 (GB) ..................................... 1904135

(51) Int. Cl.
*H01J 49/10* (2006.01)
*H01J 49/00* (2006.01)
*H01J 49/42* (2006.01)

(52) U.S. Cl.
CPC .......... *H01J 49/005* (2013.01); *H01J 49/105* (2013.01); *H01J 49/4295* (2013.01)

(58) Field of Classification Search
CPC ..... H01J 49/005; H01J 49/105; H01J 49/4295
See application file for complete search history.

(56) References Cited

U.S. PATENT DOCUMENTS 6,259,091 B1 7/2001 Eiden et al.
6,630,662 B1 * 10/2003 Loboda ................ G01N 27/623 250/281

(Continued)

FOREIGN PATENT DOCUMENTS

GB 2448568 A 10/2008
GB 2490582 A 4/2012

(Continued)

OTHER PUBLICATIONS

Combined Search and Examination report mailed on Sep. 27, 2019, for GB Patent Application No. 1904135.9.

(Continued)

*Primary Examiner* — David E Smith
(74) *Attorney, Agent, or Firm* — Klarquist Sparkman, LLP

(57) ABSTRACT

A method of operating a collision cell (10) in a mass spectrometer is disclosed. The collision cell comprises an entrance aperture (116), an exit aperture (117) and electrodes (113, 114) for producing electric fields. The method comprises feeding ions in a forward axial direction (LD) through the entrance aperture into the collision cell, producing a first electric field to trap ions, and subsequently producing a second electric field to accelerate trapped ions in the forward axial direction. The method further comprises producing a gas flow (G1) which is, at least at the entrance aperture (116) of the collision cell, contrary to the forward axial direction (LD), so as to reduce the kinetic energy of ions in dependence on their collisional cross sections. A collision cell arranged for carrying out the method is also disclosed, as well as a mass spectrometer comprising such a collision cell.

29 Claims, 12 Drawing Sheets

(56) References Cited

U.S. PATENT DOCUMENTS

| | | | | |
|---|---|---|---|---|
| 8,278,618 | B2 | 10/2012 | Makarov et al. | |
| 2007/0228272 | A1 | 10/2007 | Loboda | |
| 2008/0251712 | A1* | 10/2008 | Sanders | G01N 27/622 250/282 |
| 2015/0364309 | A1* | 12/2015 | Welkie | H01J 49/063 250/288 |
| 2016/0163526 | A1* | 6/2016 | Green | H01J 49/005 250/287 |
| 2017/0162371 | A1* | 6/2017 | Schoen | H01J 49/421 |
| 2019/0287776 | A1* | 9/2019 | Yamada | H01J 49/0031 |
| 2019/0376931 | A1* | 12/2019 | Yasuno | H01J 49/065 |

FOREIGN PATENT DOCUMENTS

| | | | |
|---|---|---|---|
| GB | 2525275 | A | 10/2015 |
| GB | 2555247 | A | 4/2018 |
| WO | 2004109741 | A2 | 12/2004 |

OTHER PUBLICATIONS

International Search Report and Written Opinion mailed on Jun. 23, 2020, to PCT Application No. PCT/EP2020/058615.

* cited by examiner

INTERFERENCE SUPPRESSION IN MASS SPECTROMETER

CROSS-REFERENCE TO RELATED APPLICATIONS

This application is a National Stage application filed under 35 USC § 371 of International Patent Application No. PCT/EP2020/058615, filed on Mar. 26, 2020. PCT Application No. PCT/EP2020/058615, claims priority to GB Patent Application No. 1904135.9, filed Mar. 26, 2019, both of which are incorporated by reference herein in their entirety.

TECHNICAL FIELD OF THE DISCLOSURE

The present invention relates to the suppression of interferences when performing analyses with a mass spectrometer. In particular, the present invention may be used for, but is not limited to, suppressing polyatomic interferences in trace elemental analysis carried out with a mass spectrometer. More in particular, the present invention relates to a method of operating a collision cell in a mass spectrometer, a collision cell for use in a mass spectrometer, and a mass spectrometer provided with such a collision cell.

BACKGROUND OF THE INVENTION

Inductively Coupled Plasma (ICP) mass spectrometry (MS) has been extensively used in a variety of applications, including geological, environmental, food and safety, and biomedical studies. In typical ICP-MS analysis, a sample is nebulized into a spray chamber along with a carrier gas. The latter is used to assist in sample ionization and ion transport from the atmospheric pressure region to the downstream elements of a mass spectrometer operating at a reduced pressure. It is well-known that the analyte species are vaporized, atomized, ionized and transported along with other substances, collectively referred to as a matrix, or the matrix ions in the ionized form.

In commercial ICP-MS instruments, a typical carrier gas is argon (Ar), which forms a high-temperature (>8,000 K) argon plasma. If a weak-concentration (2%) nitric acid ($HNO_3$) aqueous solution containing analytes in the concentration range of several ppm (parts per million) down to several ppt (parts per trillion) is introduced into the argon plasma, a variety of different matrix ions are formed. These include $Ar^{2+}$, $ArO^+$, $ArH^+$ and many others. Given, for example, a weak concentration (0.5%) of hydrochloric acid (HCl) in the analytical solution, additional matrix ions, such as $ClO^+$ are also formed. All these ionized matrix species are polyatomic interferences in chemical analysis applications and drastically affect the detection limit of the isobaric monoatomic analytes. Moreover, the interferences exhibit very strong signals, often exceeding the analytical signals by several (two or more) orders of magnitude, thus impeding trace elemental analysis of the isobaric species. For example, molecular $ArO^+$ can interfere drastically with the detection of the major isotope of iron, $^{56}Fe$.

Several different approaches were developed to address these ICP interference problems. One approach, referred to as Kinetic Energy Discrimination (KED), makes use of a different degree of the kinetic energy loss by the interferences (usually molecular ions) and the analytes when passing through a collision/reaction cell (CRC) filled with inert gas. In the KED mode, ion species are introduced into the CRC and experience multiple collisions with the collision/reaction gas (typically He). Upon exiting the CRC, all ion species are decelerated by the entrance to the analytical quadrupole positioned downstream of the CRC. Deceleration is e.g. achieved by biasing the analytical quadrupole rods several volts (approx. 2 to 3 V) higher than the CRC rods. The analyte species, which exhibit a lower degree of kinetic energy loss, are more readily transmitted through this energy barrier and into the analytical quadrupole and then further toward the MS detector. While widely adopted in the field, the KED approach is characterized by quite drastic losses of the analyte signals, typically up to an order of magnitude in the higher m/z (mass-to-charge) range for ICP-generated ions (m/z 100-m/z 200) and more than three orders of magnitude loss for lower m/z ions (below m/z 50-60). Moreover, if ion selection is employed prior to the CRC operating in the KED mode, the analytical losses are even greater, as the space charge component intrinsically assisting transmission through the pressurized cell is removed.

Another approach is described in U.S. Pat. No. 6,259,091, which employs a 3D collision cell filled with a reactive reagent gas, such as $H_2$, to selectively remove argon (Ar) based interferences. The reactive gas introduces two types of beneficial reactions in elemental chemical analysis: it neutralizes the more intense argon-based interference species and shifts the interference and the analyte ions from each other in the m/z domain. Though shown to be efficient for removing $Ar^+$ and lower m/z interferences, the approach is deficient of broader applicability to different types of interferences. It works best in the charge-exchange reactions with the analytes, whose ionization potential is lower than that of the reagent, which, in turn, is lower than that of the interference. The approach of U.S. Pat. No. 6,259,091 has therefore a limited application range.

It is noted that it is known per se to use both a gas stream and a static axial electric field in mass spectrometry, as disclosed in e.g. WO 2004/109741. However, in the known arrangements the gas stream and the axial electric field work in opposite directions. That is, if the gas flows in the direction in which the ions are fed into the device and thus assists the movement of the ions, the electric field is arranged to decelerate or even stop some ions. If the gas flows in the opposite direction, the electric field is arranged to accelerate the ions to overcome the decelerating effect of the gas flow for at least some ions. There is thus a balancing of the gas flow and the electric force in the prior art arrangements. This limits their use in suppressing polychrome interferences.

SUMMARY OF THE DISCLOSURE

It is an object of the present invention to overcome the shortcomings of the prior art and to provide a method of operating a collision cell in a mass spectrometer, which allows interferences to be suppressed, in particular, but not exclusively, matrix interferences in inductively coupled plasma mass spectrometry (ICP-MS) analysis.

Accordingly, the present invention provides a method of operating a collision cell in a mass spectrometer, wherein the collision cell comprises an entrance aperture, an exit aperture, at least one DC exit electrode, at least one pair of RF axial electrodes and at least one DC axial electrode, the method comprising:

feeding ions in a forward axial direction through the entrance aperture into the collision cell, producing, using the at least one pair of RF axial electrodes, an RF electric field distribution for radially confining the ions, producing, during a first time period and using the at least one DC exit electrode, a first DC electric field distribution for trapping ions in the collision cell, producing, during a second time period and using the at least one DC exit electrode, a second DC electric field distribution for releasing trapped ions in the forward axial direction towards the exit aperture, producing in the collision cell a gas flow which is, at least near the entrance aperture, contrary to the forward axial direction, so as to separate ions in dependence on their collisional cross sections, and producing, using the at least one DC axial electrode, a further DC electric field distribution having an axial field gradient for modulating the kinetic energy of ions entering the collision cell through the entrance aperture, wherein the axial field gradient is arranged for reducing the kinetic energy of the ions entering the collision cell.

By producing an RF electric field distribution, the ions entering the collision cell can be radially confined, preferably in a space on the central axis of the collision cell. Such a confinement prevents ions from being lost and thus increases the yield of the collision cell. The RF axial electrodes used for producing the RF field distribution may constitute a quadrupole arrangement, for example.

By producing a first DC electric field distribution for trapping ions and a second DC electric field distribution for releasing trapped ions during a first time period and a second time period respectively, ions can be trapped in and released from the collision cell. The first and second time periods, which define a trapping event and a releasing (or purging) event respectively, are preferably consecutive. The first DC electric field distribution and the second DC electric field distribution allow the collision cell to be used as an ion trap, in particular as a linear ion trap.

By producing in the interior of the collision cell a gas flow which is, at least in the vicinity of the entrance aperture but preferably over a substantial part of the length of the collision cell, contrary to the forward direction of the ions, it is possible to separate ions based on their collisional cross sections. The gas flow which is contrary to the forward direction of the ions may, for example, be produced over at least half the length of the collision cell. The counterflow of gas causes a drag force which reduces the velocity of the ions. The change in velocity will be approximately proportional to the collisional cross sections of the ions. Ions having a larger (collisional) cross section are more likely to collide with gas molecules than ions having a smaller (collisional) cross section and are therefore more likely to have their velocities reduced by the gas. This effect is enhanced by the counterflow of the gas, as compared with conventional collision cells in which the gas is stationary.

As a result of the cross section dependent velocity reduction of the ions, a spatial separation of ions having different (collisional) cross sections can take place, also when the ions belong to different isobaric ion species. This is in particular advantageous when atomic ions are to be separated from interfering molecular ions, such as molecular matrix ions.

The combination of trapping with a DC field and cross section-based separation allows ions to be selectively trapped. According to the invention, ions having a relatively small collisional cross section can be trapped and thus collected, while ions having a relatively large collisional cross section can be prevented from being trapped and be rejected. The trapping allows a quantity of selected ions to be collected for further processing, such as mass filtering and/or detection.

Without being bound or limited by any theory or explanation, the relatively smaller atomic ions may be enabled to reach the exit aperture of the collision cell whereas relatively larger polyatomic ions of the same mass-to-charge ratio (m/z) may be prevented from reaching the exit aperture by the decelerating effect of the gas flow drag. The method of the invention is particularly applicable to ions having a high initial kinetic energy when they enter the collision cell.

In another aspect, the invention provides a method of mass spectrometry comprising:

generating ions in a plasma ion source, transporting the ions to a collision cell, and operating the collision cell according to the method of operating a collision cell in a mass spectrometer described above, wherein producing a second DC electric field distribution causes ions to be ejected from the collision cell, the method further comprising:

transporting the ejected ions to a mass analyzer, and mass analyzing the ions in the mass analyzer.

It is noted that ion trapping devices for use in mass spectrometers are well known. U.S. Pat. No. 8,278,618 (Thermo Fisher Scientific) for example, the contents of which are herewith incorporated by reference in this document, discloses a gas-filled collision cell in which a trapping field can be generated to trap ions. Trapped ions are processed in the collision cell and an electric field gradient is generated which causes processed ions to exit the collision cell in reverse direction. This reversal of the direction in which ions travel through the device is in some applications undesired. In the method of the present invention, the ions which are released exit the trap in substantially the same forward axial direction in which they entered, that is, their direction does not substantially change. In addition, U.S. Pat. No. 8,278,618 does not address the issue of matrix interferences.

Using the at least one DC axial electrode to provide a voltage gradient, the method of the invention further comprises producing, using the at least one DC axial electrode, a further DC electric field distribution having an axial field gradient for changing the kinetic energy of ions entering the collision cell through the entrance aperture.

A DC axial electrode having a voltage gradient may be constituted by a structure comprising a series of respective DC electrodes axially mounted on an insulating substrate and a series arrangement of resistors for providing an electrical resistance gradient. The plurality of resistors interconnects the respective DC electrodes so that, when the DC axial electrode is connected to a DC voltage source, an axial electric field gradient is produced. The structure may be a so-called vane and the insulating substrate may comprise a printed circuit board (PCB).

Each DC axial electrode may occupy a space between adjacent RF axial electrodes. In one embodiment, four DC axial electrodes occupy the respective spaces between the four RF axial electrodes.

An axial electric field gradient provides an additional mechanism for changing the velocity of the ions. By using a combination of a gas flow and an axial electric field gradient, the selection of ions to be trapped can be further improved. More in particular, the axial field gradient offers another mechanism to alter the kinetic energy and hence the velocity of the ions.

In some embodiments, the axial field gradient may be zero or substantially zero during the first time period (injection event) and possibly also during the second time period (release event). However, non-zero values of the axial field gradient are preferred. In particular, the axial field gradient can be arranged for reducing the kinetic energy of the ions entering the collision cell. Thus, the axial field gradient may enhance the effect of the gas counterflow.

The axial field gradient may be constant or may vary in time, for example per time period or even within a time period. When the axial field gradient is arranged for reducing the kinetic energy of the ions entering the collision cell, the axial electric field gradient may be greater during the second time period than during the first time period. Conversely, during the first time period the axial field gradient may be smaller than during the second time period. As a result, the kinetic energy of the ions will be reduced more during the second period, in which trapped ions are released from the collision cell, than during the first period, during which ions are being injected and trapped. This prevents ions entering the collision cell from mixing with the ions which are being released. In some embodiments, the axial field gradient during the first time period may be zero or may even be arranged for increasing the kinetic energy of the ions.

It is noted that the kinetic energy reduction of the ions due to the gas flow and the kinetic energy reduction due to the axial field gradient are supplementary but not identical. The gas flow reduces the kinetic energy dependent on the collisional cross section of the ions, while the axial field gradient reduces the kinetic energy dependent on their charge.

The gas pressure in the collision cell may be between 0.001 mbar and 0.1 mbar. Preferably, the gas pressure may be between 0.005 mbar and 0.02 mbar and may for example be approximately 0.01 mbar (1 Pa). The collision cell may be located within a vacuum chamber of a mass spectrometer, that is, in communication with a vacuum pump. In such a configuration, the gas pressure in the collision cell may depend on the pressure in the surrounding vacuum chamber in addition to the gas flow rate.

In an embodiment, the gas flow contrary to the forward axial direction at the entrance aperture has a flow rate of between 5 ml/min and 40 ml/min. More in particular, the gas flow rate at the entrance aperture may be between 10 ml/min and 15 ml/min, preferably approximately 12 ml/min.

It is preferred that the further DC electric field distribution is dependent on the gas flow rate. That is, the presence and/or the magnitude of the axial field gradient preferably depends on the flow rate of the gas flow. In an embodiment, the kinetic energy decreasing further DC electric field distribution may only be produced when the gas flow at the entrance aperture has a flow rate which is lower than a threshold value. Above the threshold value of the gas counterflow, the kinetic energy decrease of the ions may be such that the ions fail to reach the output aperture if a kinetic energy decreasing further DC electric field distribution would be present.

The threshold value may, for example, be between 8 ml/min and 12 ml/min, while a threshold value of approximately 10 ml/min is preferred. It will be understood that the threshold value may depend on various parameters, such as the dimensions of the collision cell, the gas used, the ions to be trapped and the ions to be rejected.

In an embodiment, the axial field gradient may be arranged for temporarily increasing the kinetic energy of the ions entering the collision cell during an alternative mode of operation. Thus, the axial field gradient may in such an embodiment temporarily reduce the effect of the gas counterflow.

When the axial field gradient is arranged for increasing the kinetic energy of the ions entering the collision cell during the time when an alternative mode of operation is used, the axial electric field gradient may be smaller during the second time period than during the first time period. Conversely, the axial electric field gradient may be greater during the first time period than during the second time period. That is, during the releasing event the axial field gradient increases the kinetic energy less than during the trapping event. This is to prevent incoming ions from mixing with the trapped ions. In some embodiments, the axial electric field gradient during the second time period may be zero or may even be arranged for decreasing the kinetic energy of the ions.

As mentioned above, the further kinetic energy reducing DC electric field distribution may only be produced when the gas flow has a flow rate which is lower than a threshold value. That is, if the gas flow rate is higher than the threshold value, no further kinetic energy reducing DC electric field distribution may be produced, as the gas counterflow already provides sufficient kinetic energy reduction. In fact, a further kinetic energy reduction of the ions might reduce their velocity too much and event hinder the trapping of the ions.

The gas counterflow may extend over a substantial part of the collision cell and may extend over the entire length of the collision cell, but that is typically not necessary to achieve the benefits of the invention. In some embodiments, the gas counterflow may extend over only approximately one third or one quarter of the length of the collision cell.

In an embodiment, therefore, the gas flows contrary to the forward axial direction of the ions from between approximately one quarter and approximately three quarters of the distance between the entrance aperture and the exit aperture, preferably from approximately halfway between the entrance aperture and the exit aperture. In such an embodiment, the gas flow direction is opposite to the forward axial direction of the ions over approximately a first half of the length of the collision cell, and substantially identical to the forward axial direction over approximately a second half of the length of the collision cell.

In another embodiment, the gas flows from approximately the exit aperture contrary to the forward axial direction of the ions and may thus extend over substantially the entire length of the collision cell. In such an embodiment, the gas flow is a counterflow over substantially the entire length of the collision cell.

The gas flow may comprise a gas which is non-reactive with the ions. The non-reactive gas preferably is an inert gas, such as helium.

The first time period, in which the injection event takes place, and the second time period, in which the release event takes place, may have different time durations. The first time period may be between 2 and 30 times longer than the second time period, for example approximately 10 times longer or 20 times longer. For example, the first time period may have a duration of approximately 2 ms while the second time period may have a duration of approximately 0.2 ms or less, for example 0.1 ms. Bigger differences in the respective time durations are, however, also possible. The first time period may be more than 30 times longer than the second time period, for example 40 or even 50 times.

The second time period may be followed by the first time period again, or by another time period, such as a delay. The cycle of operations performed in the first time period (period T1) followed by the second time period (period T2) can be repeated as many times as desired until the required number of ions have been released and mass analyzed. The voltages applied to the ion trap, such as the voltages to produce an axial gradient, can be adjusted between cycles, if necessary, to adjust the interferences that are removed from the ions.

When the collision cell comprises two pairs of RF axial electrodes constituting a quadrupole arrangement, the method may comprise producing, using the quadrupole arrangement, the RF electric field distribution for radially confining the ions. Instead of a quadrupole arrangement, an alternative arrangement having a different number of poles may be used, such as a hexapole or octupole, for example. The collision cell may therefore comprise three or more pairs of RF axial electrodes constituting a hexapole, octupole or higher order arrangement, while the method may comprise producing, using the hexapole, octupole or higher order arrangement, the RF electric field distribution for radially confining the ions. Although the confining RF field may be permanently present, it could be absent during the release event, for example.

Although the ions may originate from various sources, the invention is particularly useful in applications where the ions originate from a plasma source and comprise atomic ions and polyatomic ions. In such applications, the atomic ions may be desired ions or analyte while the polyatomic ions may be undesired or matrix ions. The method of the invention is very suitable for separating monatomic analytes from polyatomic interferences of the same mass-to-charge (m/z) ratio, allowing the monatomic analytes to pass through the trap while rejecting the polyatomic interferences due to their larger collisional cross section.

The present invention is based upon the insight that the drag effect caused by the gas depends on the (collisional) cross section of the ions. Embodiments of the invention are also based upon the further insight that the combination of the drag force caused by the gas flow and the electrostatic force caused by the axial electric field gradient is efficient when removing polyatomic interfering ions. In turn, removing the undesired ions allows trapping the desired ions more efficiently. That is, ions having a small collisional cross section can reach the exit region of the ion trap where they are accumulated, while ions having a larger collisional cross section (such as matrix ions) will be exposed to the combination of the gas flow drag and the electrostatic forces to such an extent that they will not reach the exit region of the collision cell. As a result, the undesired space charge effects due to high abundances of the matrix ions are mitigated.

It is noted that U.S. Pat. No. 6,630,662 discloses an ion guide for a mass spectrometer. This prior art ion guide is provided with sectioned axial electrodes for generating DC and RF electric fields along the ion guide and is further arranged for producing a gas flow so as to cause a drag force. In U.S. Pat. No. 6,630,662, the drag force of the gas flow and the gradient of the electric field work in opposite directions: the forward axial electric field accelerates the ions into the ion guide while the backward drag force of the gas flow decelerates the ions, allegedly allowing the ions to be trapped by a proper balancing of the axial electric field and the gas flow. The ion guide of U.S. Pat. No. 6,630,662 lacks a DC exit electrode for trapping and releasing ions.

In the method of the invention, a second time period, during which the second DC electric field distribution is produced, can be preceded by a first time period, during which the first DC electric field distribution is produced. Conversely, a second time period can be followed by a first time period, either immediately or after a third time period. In such a third time period, no DC fields may be produced, and no ions may be fed into the collision cell, for example.

The present invention additionally provides a collision cell for use in a mass spectrometer, the collision cell comprising:

an entrance aperture for receiving ions in a forward axial direction, an exit aperture for emitting ions in the forward axial direction, at least one DC exit electrode for producing, during a first time period, a first DC electric field distribution to trap ions and for producing, during a second time period, a second DC electric field distribution to release trapped ions in the forward axial direction towards the exit aperture, at least one pair of RF axial electrodes for producing an RF electric field distribution for radially confining ions, at least one gas inlet port for receiving a gas flow which is, at least near the entrance aperture, contrary to the forward axial direction, so as to separate ions in dependence on their collisional cross sections, and at least one DC axial electrode for producing a further DC electric field distribution having an axial field gradient for modulating the kinetic energy of ions entering the collision cell through the entrance aperture, so as to reduce the kinetic energy of the ions entering the collision cell.

The collision cell according to the invention has the same advantages as the method described above. The collision cell may have one, two, three, four or another number of pairs of axial RF electrodes. Similarly, the collision cell may have one, two, three, or another number of DC exit electrodes.

The at least one DC exit electrode, which may also be referred to as trapping electrode, may be arranged near the exit aperture of the collision cell. In some embodiments, the at least one DC exit electrode may define the exit aperture. That is, in some embodiments a DC exit electrode may be constituted by an element, such as a disc or plate, having a through hole constituting the exit aperture. The exit aperture may thus be provided in the DC exit electrode. In such embodiments, the at least one DC exit electrode may define the exit aperture.

The at least one DC axial electrode may have a resistance gradient, which may be constituted by a series arrangement of resistors, for example.

In the collision cell of the invention, the axial field gradient is normally arranged for decreasing the kinetic energy of the ions entering the collision cell. The inventive collision cell may further be arranged for only producing the further DC electric field distribution when the gas flow has a flow rate which is lower than a threshold value. The threshold value may be between 8 ml/min and 12 ml/min, and may preferably approximately 10 ml/min.

In another embodiment, the axial field gradient may be arranged for increasing the kinetic energy of the ions entering the collision cell in an alternative mode of operation. In such an embodiment, the collision cell may be arranged for producing a smaller axial electric field gradient during the second time period than during the first time period.

An embodiment in which the axial field gradient is arranged for increasing the kinetic energy of the ions entering the collision cell may further be arranged for only producing an electric field having an accelerating axial field gradient when the gas flow has a flow rate which is higher than a threshold value. The threshold value may be being between 8 ml/min and 12 ml/min, and may preferably be approximately 10 ml/min.

The collision cell according to the invention may further comprise a gas source for providing a flow rate of the gas flow at the entrance aperture between 5 ml/min and 40 ml/min. The flow rate may be between 10 ml/min and 15 ml/min, for example approximately 12 ml/min.

The collision cell according to the invention may be arranged to maintain a gas pressure between approximately 0.001 mbar and 0.1 mbar, preferably between approximately 0.005 and 0.02 mbar, more preferably approximately 0.01 mbar.

The at least one gas inlet port may be arranged between approximately one quarter and three quarters of the distance between the entrance aperture and the exit aperture, preferably approximately halfway between the entrance aperture and the exit aperture. In another embodiment, the at least one gas inlet port may be arranged approximately at the exit aperture.

The gas flow may comprise a gas which is non-reactive with the ions, for example an inert gas, such as helium. Other gases, such as nitrogen or argon, may be used.

The collision cell according to the invention may further comprise a voltage source for providing positive and/or negative voltages for trapping and releasing positive and/or negative ions. While ICP-MS applications generate positively charged ions, the invention may also be applied when using other ionization sources capable of producing negative ions.

Typical voltages applied at the DC exit electrode may range from −100 V to +50 V, for example, while to the DC axial electrodes voltages may be applied which range from −40 V to +10 V. In addition, the RF axial electrodes may be provided with a DC bias ranging from −40 V to +10 V. However, other suitable voltages may also be chosen, depending on the type or types of ions and the geometry of the collision cell.

In an exemplary embodiment, a voltage of −35 V is applied at one electrode at one end of the DC axial electrodes and a voltage of −5 V at another electrode at another, opposite end, thus creating a −30 V gradient over the length of the DC axial electrodes and an effective electric field distribution gradient of −0.6 V on the central axis of the collision cell, assuming a field penetration efficiency of 2% at the central axis. When the electrodes have a length of 130 mm, for example, this results in an effective electric field distribution gradient on the central axis of −4 mV/mm.

At any time during operation, the collision cell can be switched for a period of time to a conventional pass-through mode, that is, without trapping and releasing events. For example, when analyzing a region of the m/z spectrum which does not have ions which are possibly interfering (such as matrix interferences), the first DC electric field distribution for trapping ions can be switched off and thus does not need to be followed by the second DC electric field distribution for releasing trapped ions. A DC electric field distribution can be absent during the pass-through mode. In some embodiments, in the pass-through mode an accelerating (in the forward direction) DC axial field gradient could be applied in the collision cell.

The present invention additionally provides a mass spectrometer comprising a collision cell as described above. The mass spectrometer according to the invention may further comprise at least one ion source, at least one mass analyzer and at least one detector for detecting ions. The at least one mass analyzer may, for example, comprise a quadrupole, or a magnetic sector mass analyzer, or an FTMS mass analyzer, or an orbital trapping mass analyzer (such as an Orbitrap™ mass analyzer). The ion source may be a plasma source, for example an ICP (inductively coupled plasma) source or a microwave induced plasma (MIP) source. The ions are typically positively charged ions when they are generated by a plasma ion source.

A mass spectrometer typically comprises a controller configured to control at least one voltage source for supplying voltages to the electrodes so as to carry out the method of the present invention. The controller may also control the electric voltages applied to various components of the spectrometer, including but not limited to the at least one ion source, any ion guides, any mass filters, mass analyzers and detectors. The controller may comprise at least one microprocessor with an associated memory. A computer program can be provided having modules of program code for causing the at least one processor to carry out the method of the present invention.

The present invention also provides a kit-of-parts for providing a mass spectrometer, the kit-of-parts comprising at least two of:

at least one ion source, at least one mass analyzer, at least one detector for detecting ions, and at least one collision cell as described above.

The kit-of-parts, when assembled, may provide a mass spectrometer as described above.

DETAILED DESCRIPTION OF EMBODIMENTS

Figure 1:
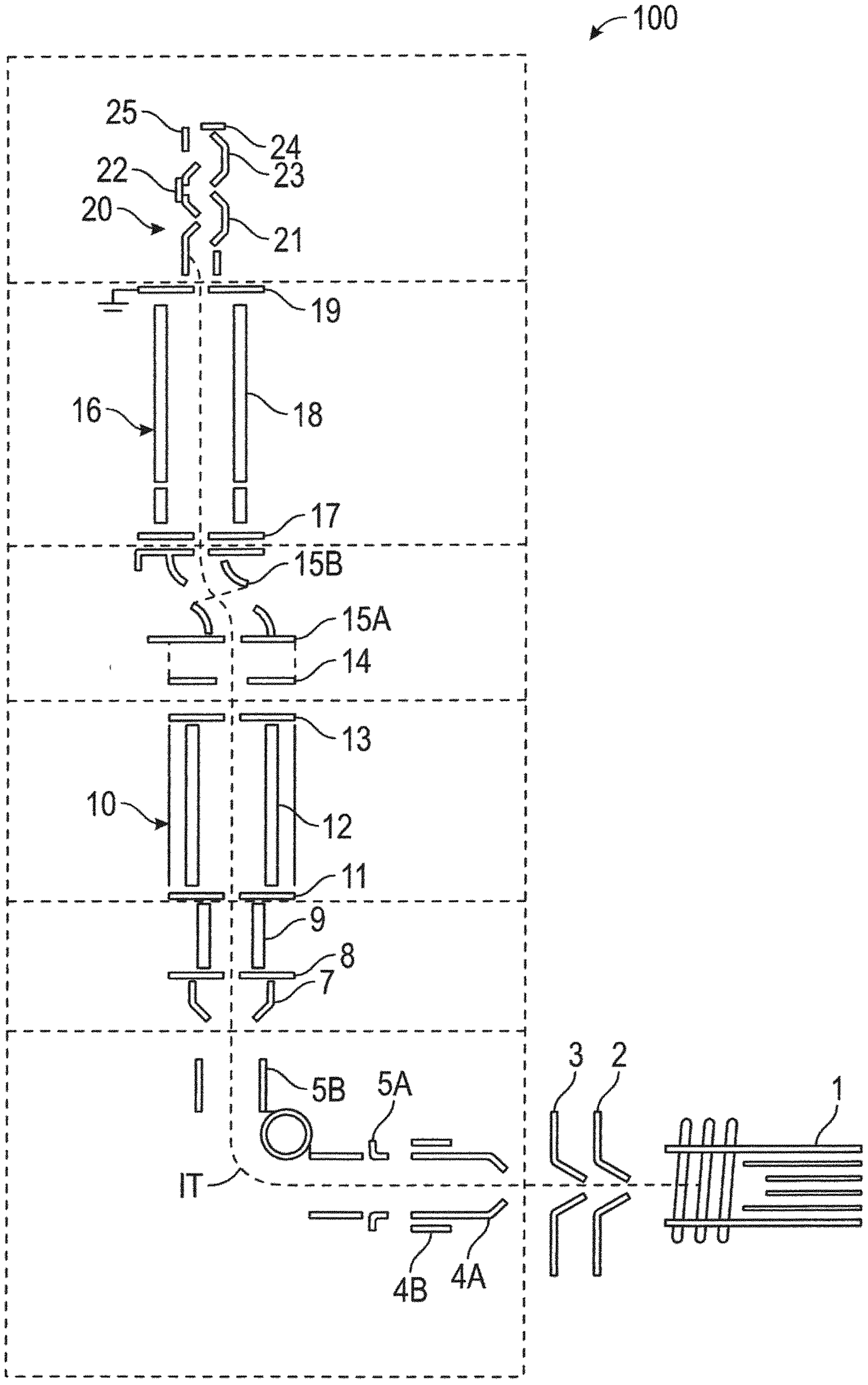
FIG. 1 schematically illustrates a first exemplary embodiment of a mass spectrometer according to the present invention.

A problem that often occurs in mass spectrometry is that undesired isobaric ion species mix with the desired analyte ions, resulting in undesired spectral signals at the same or similar positions in the m/z (mass/charge) domain as the spectral signals of the desired analyte ions. These undesired signals, the so-called interferences, make quantitation based upon the spectral signals unreliable and may even result in suppression of certain analyte signals. The present invention addresses this problem by using a combination of a gas flow and electric fields to block or suppress unwanted ion species and to let through only the analytes of interest.

The invention is based on the insight that the drag force experienced by ions moving through a gas stream can be used to separate those ions. It is known per se that particles moving through a viscous gas flow experience a drag force, Fd, which is described by the Stokes-Cunningham formula:

$$\vec{F_d} = -\frac{6\pi\mu R}{1 + K_n\left[A + B\exp\left(\frac{E}{K_n}\right)\right]}\vec{V} \tag{1}$$

where $$K_n = \frac{\lambda}{R} \tag{2}$$

where $$\lambda = \frac{1}{\sqrt{2}\,\pi\sigma^2 N} \tag{3}$$

and where A, B and E are constants, μ is the gas viscosity, R is the analyte (particle) radius, Kn is Knudsen's number, V is the analyte velocity, λ is the analyte mean free path, σ is the gas molecule collisional cross section and N is the gas number density.

In a viscous gas flow, the drag force is directed opposite to the particle (e.g. analyte) velocity and is proportional to the effective radius of the particle. In a collision cell or a collision-reaction-cell (CRC), therefore, ionized species introduced into a counterflow of gas (when the direction of the gas flow is opposite to the ion's initial velocity) will lose kinetic energy and hence be decelerated. This deceleration will be proportional to the collisional cross sections of the ions, as ions having a larger (collisional) cross-section are more likely to collide with gas molecules than ions having a smaller (collisional) cross-section. As a result, the drag force represented by Eq. (1) above will predominantly be exerted on larger isobaric ions having larger collisional cross-section. These larger cross-section species transfer a higher degree of their initial kinetic energy to the gas molecules, giving rise to the spatial separation of species of different collisional cross-sections, even when those species are isobaric.

By also producing an axial electric field distribution in the collision cell, the kinetic energy of the ions can be further altered. In this way, an additional mechanism to change the kinetic energy of ions is provided. The electric field force exerted on the charged species is governed by:

$$\vec{F_e} = e\vec{E} = e\nabla\varphi \tag{4}$$

where e is the elementary charge and ϕ is the electric potential. Therefore, an increase in the axial potential gradient results in a proportional increase in the electric field strength, E, which would drive the charged species at a constant velocity Vd through the viscous gas based on the species' mobility, k:

$$\vec{V_d} = k\vec{E} \tag{5}$$

In the lower viscosity regime (gas flow rate of <10 mL/min), the decelerating electric field may have a constant field strength applied on the axis of the collision cell.

A collision cell may additionally be used as an ion trap, by providing additional electric fields for trapping and releasing ions. Ion manipulation in a collision cell used as an ion trap may be represented by two events, which may be referred to as (ion) injection event and (ion) release event. In accordance with the invention, a collision cell is provided which allows desired analytes to be trapped and subsequently released while rejecting unwanted species.

An exemplary embodiment of a mass spectrometer in which the invention may be applied is schematically shown in FIG. 1.

The mass spectrometer 100 of FIG. 1 is a modified triple-quadrupole mass spectrometer, which incorporates a higher-energy collisional dissociation (HCD) cell 10 as a CRC (collision reaction cell). The mass spectrometer 100 is shown to comprise an inductively coupled plasma (ICP) ion source 1, which may, for example, employ a 1400 W RF (radio frequency) generator operating at a frequency of 27 MHz. The mass spectrometer 100 of FIG. 1 further comprises a sampling cone 2, a skimmer cone 3, ion extraction optics 4A and 4B, angular deflection components 5A and 5B, a preselection quadrupole focus lens 7, a preselection quadrupole entry aperture 8, and a preselection quadrupole 9. The preselection quadrupole 9 can select a mass range of ions to be transmitted downstream for analysis.

A collision cell (or collision reaction cell) 10 comprises, in the example shown, a second quadrupole. The collision cell 10 is shown to comprise an entrance aperture electrode 11, quadrupole rods 12 and an exit aperture electrode 13. An intermediate deflector assembly comprises deflector assembly components 14, 15A & 15B, which may be referred to as Focus, D2 and D1, respectively. A third or analytical quadrupole 16 is shown to comprise an entrance aperture electrode 17, analytical quad rods 18, and an analytical quad exit aperture electrode 19. A detector assembly 20 is shown to comprise a detector analog dynode 21, a detector analog signal electrode 22, a detector gate 23, a detector counting signal 24 and a detector counter dynode 25, which serves an electron multiplier electrode. Alternatively, a Channeltron® or microchannel plate (MCP) detector could be used. In other embodiments, the detector assembly 20 may comprise Faraday cups. In some types of mass analyzer, such as an FTMS (Fourier transform mass spectrometer) type, the detector may comprise an image current detector that detects oscillating ions in the analyzer.

The mass spectrometer 100 may comprise further parts which are not shown in FIG. 1 for the sake of simplicity of the drawing. For example, one or more voltage sources may be arranged for supplying AC and/or DC voltages to the quadrupole arrangements, while a gas source may supply gas to the collision cell 10. Similarly, a gas source may be arranged for supplying gas to the ICP ion source 1.

The mass spectrometer 100 can be arranged such that ions have a high initial kinetic energy when they enter the collision cell 10. Those skilled in the art will easily be able to apply suitable voltages to various parts in order to accelerate the ions, if necessary.

An ion source 1, a sampling cone 2, a skimmer cone 3, ion optics 4A & 4B, a collision cell 10, a mass analyzer 16 and a detector assembly 20 may be supplied as a kit-of-parts for producing a mass spectrometer according to the invention. A kit-of-parts for producing a mass spectrometer according to the invention may include more or fewer parts.

The ion trajectory IT from the ion source 1 through the various parts of the mass spectrometer 100 to the detector assembly 20 is also shown in FIG. 1.

Figure 2B:
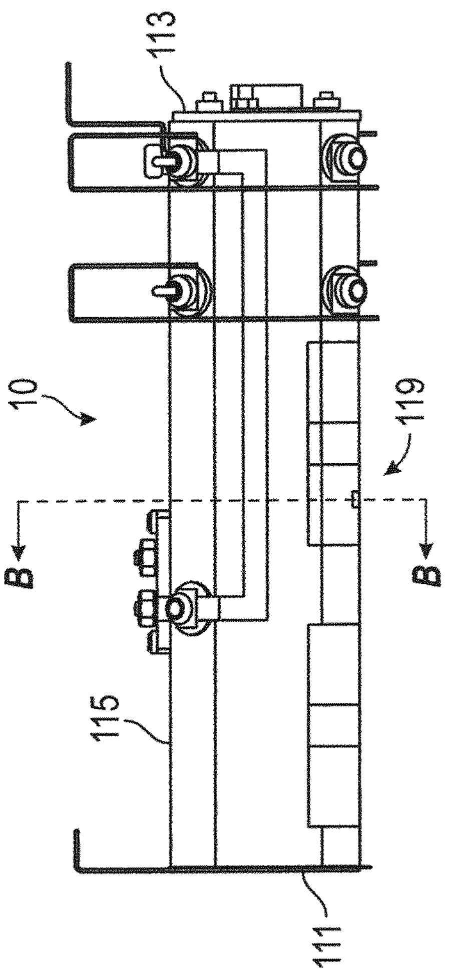
FIGS. 2A-2G schematically illustrate an exemplary embodiment of a collision cell according to the present invention and its functioning.
Figure 2D:
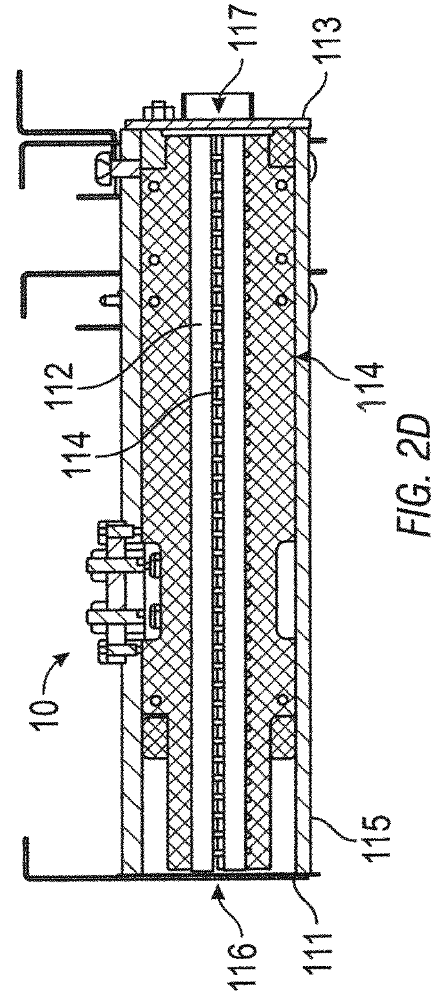
Figure 2A:
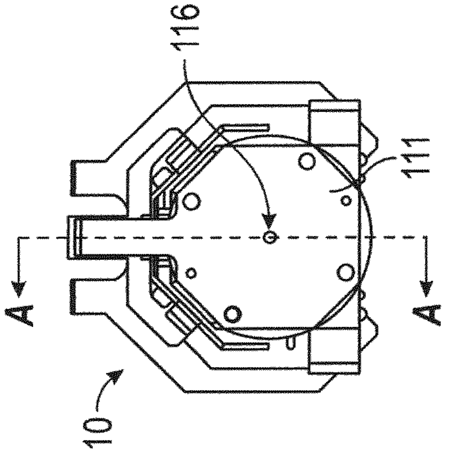
Figure 2C:
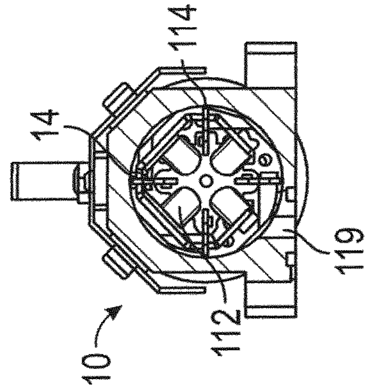
Figure 2E:
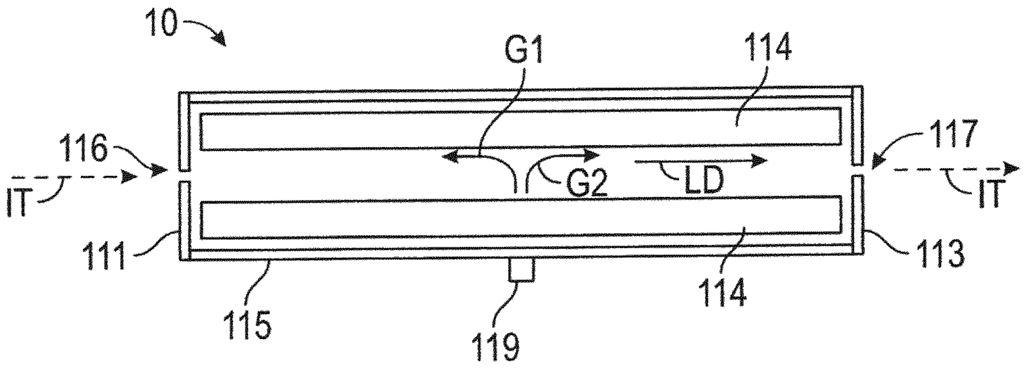
Figure 2F:
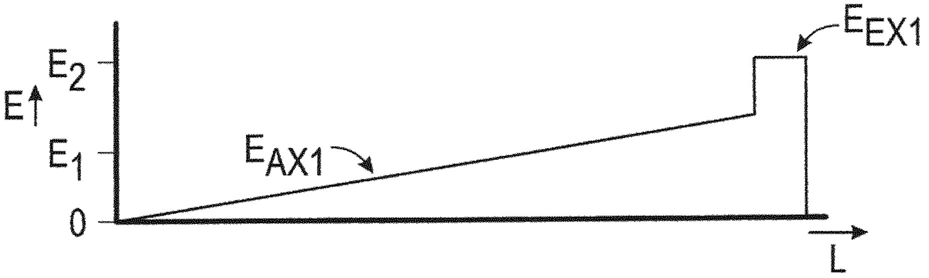
Figure 2G:
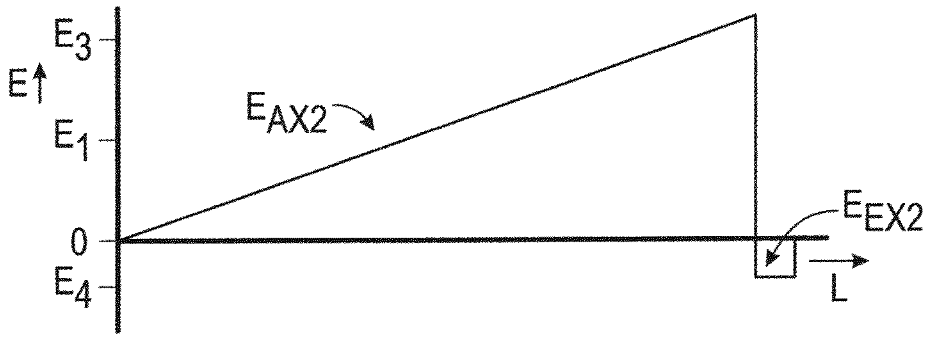

An exemplary embodiment of the collision cell 10 of FIG. 1 is shown in more detail in FIGS. 2A-D, while aspects of its functioning are schematically shown in FIGS. 2E-G. The collision cell 10 is shown in a front view in FIG. 2A and in a side view in FIG. 2B. FIG. 2C shows a cross-sectional view along the line B-B in FIG. 2B while FIG. 2D shows a cross-sectional view along the line A-A in FIG. 2A.

The collision cell 10 is shown to include a housing 115 having a front end where ions can enter and a rear end where ions can exit. At the front end, an entrance aperture electrode 111 (which may correspond with the entrance aperture electrode 11 in FIG. 1) is constituted by a plate having an entrance aperture 116, while at the rear end an exit aperture electrode 113 (which may correspond with the exit aperture electrode 13 in FIG. 1) is constituted by a plate having an exit aperture 117. Quadrupole rods 112 and axial field gradient vanes 114 are arranged in the longitudinal direction (LD in FIG. 2E) of the housing 15, parallel to its longitudinal axis. As can be seen in FIG. 2C, the collision cell 10 has four vanes 114 which are located in the respective spaces between the four quadrupole rods 112.

An inlet port 119 is provided in the housing 115 to allow gas to enter the housing. As can be seen in FIG. 2B, in the embodiment shown the inlet port 119 is located approximately halfway along the length of the housing. In this embodiment, the gas entering the housing 115 will be distributed approximately evenly over the upstream and downstream sections of the housing. At a flow rate of 10 ml/min, for example, the gas may have a pressure of approximately 0.01 mbar (1 Pa). In some embodiments, the inlet port may be located closer to the entrance aperture 116 or closer to the exit aperture 117, for example at about one quarter of the length, or at about three quarters of the length of the housing 115.

The vanes 114 may be constituted by a PCB (printed circuit board), for example a ceramic or polymeric PCB, with an arrangement of resistors, for example twenty resistors arranged in series, of 50 k□ each, to implement a voltage divider that can provide a range of voltages along the vanes, for example a progressive range. Such a series arrangement of resistors is described in U.S. Pat. No. 7,675,031 or 8,604,419, for example, where each vane is segmented into a number of sections (or segments). Each section produces a voltage which is determined by the voltages applied to the entrance and exit segments and the values of the resistors. By applying a suitable voltage to the vanes, a voltage gradient and a corresponding axial electric field gradient are produced. The penetration of the electric field of each vane at the longitudinal axis of the collision cell is typically only about 2%, so that when 30 V is applied to the vane, only 0.6 V contributes to the electric field at the axis.

The plate (or exit aperture part) 113 defining the exit aperture 117 can serve as an electrode, in particular as a DC exit electrode, which may be used for trapping and releasing ions, thus enabling the use of the collision cell as an ion trap. During an injection event in a first time period, ions can be trapped, while during a releasing event in a second time period, ions can be released or purged. The invention allows only desired ions, such as analyte ions, to be trapped and subsequently released.

The collision cell may be operated in a low viscosity regime, in which the gas flow rate is smaller than approximately 15 ml/min, or in a high viscosity regime, in which the gas flow rate is equal to or greater than approximately 15 ml/min.

During the injection event in the low viscosity regime, the decelerating axial electric field gradient may be relatively shallow and may in some instances even be zero. However, non-zero values of the decelerating axial electric field gradient are preferred. The incoming ions may be trapped in the close proximity to the exit aperture 117 by biasing all quadrupole rods 112 to the same negative voltage (for example −10 V to −1 V when the incoming ions are positive), while increasing the exit aperture potential to a higher positive level (for example +10 V to +30 V). A first or entrance electrode of the vanes 114 (e.g. at the end closest to the entrance aperture 116) which produce the axial gradient may be biased to a negative voltage (for example −35 V to −10 V), which is preferentially lower than the quadrupole rod bias. A second or exit electrode of the vanes 114 (e.g. at the end closest to the exit aperture 117) has a higher voltage than the first or entrance electrode and may be shorted to the quadrupole bias. This quadrupole bias may be a voltage in the range from −10 V to −1 V, for example.

During the release event in the low viscosity regime, the decelerating axial electric field gradient may be rapidly increased. Furthermore, the quadrupole bias (which may also be referred to as quadrupole rod bias) may be increased to a level higher than the exit aperture potential. The quadrupole rod bias (which can be identical to the voltage at a second or exit electrode of the vanes) may for example be increased to a positive level (for example +2 V to +7 V), while the exit aperture potential may be decreased to a negative level (for example −100 V to −30 V). The voltage at the first electrode of the vanes may remain unchanged. As a result, a stronger axial deceleration field is generated to prevent the incoming ions from entering the trap during the second period, in which trapped ions are released from the collision cell, than during the first period, during which ions are being trapped. This prevents ions from entering the trap and mixing up with the ions which were already accumulated during the preceding injection event. Due to a strong positive axial gradient between the rods and the exit aperture, the trapped ions may be purged from the trap in a relatively short period of approximately 0.1 s. Given the duration of a typical ion injection event of 2-3 ms, ion trapping and releasing are performed at a duty cycle of greater than 95%. During the first time period, when ions are being trapped, the decelerating axial electric field gradient may be shallow and may in some embodiments even be zero. However, non-zero values of the decelerating axial electric field gradient during the first time period are preferred.

In the higher viscosity regime (gas flow rate is >15 ml/min), an acceleration field gradient may in certain instances be applied along the collision cell axis in regard to the incoming ion beam. In this case, the electrostatic field force acts against the drag force imposed on the ion species by the gas flow. The timing of the events and the potentials applied to the quadrupole rods and the exit aperture are similar to those described above. The difference is in the direction and the magnitude of the accelerating axial electric field. A stronger axial gradient may be applied during the injection event to assist ions having a smaller cross-section through the viscous gas flow. A potential in the range of, for example, +5 V to +20 V may be applied to the first or entrance electrode of the vanes 114 (the gradient entrance point), given a quadrupole rod bias of for example −10 V to −1 V. During the release event, the quadrupole rod bias (which may be the same as the voltage at the second or exit electrode of the vanes 114) may increase to for example +3 V to 7 V, resulting in a weaker axial electric field, which becomes insufficient to overcome the drag force for all the species. This prevents the incoming ions from entering the trapping region and mixing with the accumulated species.

Thus, in the present invention, a trapping or releasing DC electric field in a collision cell is combined with a gas counterflow and a decelerating axial electric field, which may in some instances be alternated by an accelerating axial electric field. This combination allows the desired ions to be trapped and the interfering ions to be rejected, thus enabling interference suppression. The gas stream and the electric fields are configured in such a way that at least a large portion of the desired ions ion population can be trapped and can be released and then subjected to analysis, while at least a large part portion of the undesired ions interfering (in the m/z domain) ion population will be blocked from proceeding further in the cell by the combination of the gas flow and the electrostatic axial electric field.

Ion trapping or accumulation near the exit aperture can enable rapid purging of ions from the collision cell and maintain a higher duty cycle of the collision cell operation. This may be enhanced by the gas flow in the forward direction in the trap region between the gas inlet port and the exit aperture. Given a higher negative (decelerating) axial electric field gradient (for the incoming ions) during the release event, such a gradient may also give rise to purging of ions from the collision cell positioned upstream of the gradient exit point in the backward (upstream) direction. This effect, which may be detrimental to the sensitivity of the method, may be mitigated by the gas flow in the forward direction in the trap region between the inlet port and the exit aperture.

In the embodiment of FIGS. 2A-2D, quadrupole rods 112 and vanes 114 are arranged in the longitudinal direction of the housing 115, the quadrupole rods acting as RF axial electrodes and the vanes acting as DC axial electrodes. In some embodiments, the rods can also act as DC axial electrodes, in which case the vanes may be omitted. That is, in some embodiments the RF axial electrodes and the DC axial electrodes can be constituted by the same electrodes, which can then be referred to as axial electrodes. These axial electrodes are in those embodiments used to produce both DC and AC (alternating current, here RF) electric field distributions.

RF and DC axial electrodes can be provided in a variety of ways, such as:

(1) quadrupole rod sets having rods that are tapered along their axial direction, such that the wide ends of the rods are at the entrance to the collision cell and the narrow ends are at the exit from the collision cell, or vice versa;

(2) quadrupoles having rods that are slanted but of uniform diameter, i.e. the ends of one pair of rods are located closer to the central axis at one end of the cell, and the ends of the other pair of rods are located closer to the central axis at the other end of the cell; a DC potential applied to the rod configuration in (1) and (2) will in both cases result in an axial potential along the central axis; in cases, (1) and (2), the axial field and RF electrodes are the same electrodes;

(3) quadrupoles having rods that are surrounded by a cylindrical shell that is divided into segments that are separated by insulating rings, and wherein an axial field is generated by applying different voltages to the different segments;

(4) quadrupole assemblies having four auxiliary rods arranged between the quadrupole rods to acts as the axial field electrodes, and wherein an axial field is generated by applying a voltage gradient across the length of the auxiliary electrodes in a parallel fashion;

(5) applying a non-uniform resistive coating to the rods in the quadrupole, so that an axial field is generated along the rods when a DC voltage is applied;

(6) having rods that are made from a resistive material in a non-symmetrical fashion along their lengths, so as to generate a field when a voltage is applied to the rods;

(7) dividing the rods into segments with insulating rings, and applying different DC voltages to the segments;

(8) having rods from insulating material having conductive metal bands at their ends, connected by resistive material; and/or (9) coating the rods with a low-resistivity material and applying different voltages to the two ends of the rods.

Exemplary axial field electrodes include those disclosed in U.S. Pat. No. 7,675,031, where an assembly of electrodes are provided as finger electrodes that are arranged on thin substrates (e.g. PCB) and disposed between the quadrupole rods of the ion trap. By applying a progressive range of voltages along the length of the electrode assembly, an axial field is generated along the assembly.

The RF axial electrodes preferably extend over most of the distance between the entrance and the exit apertures of the collision cell, for example over at least 60%, at least 70%, at least 80%, or at least 90% of the distance between the entrance and exit apertures of the collision cell. Similarly, the DC axial electrodes preferably extend over most of the distance between the entrance and the exit apertures of the collision cell, for example over at least 60%, at least 70%, at least 80%, or at least 90% of the distance between the entrance and exit apertures of the collision cell.

An exemplary embodiment of a collision cell according to the invention is schematically illustrated in FIG. 2E. The schematically shown collision cell 10 of FIG. 2E may be similar to the collision cell 10 of FIG. 2D. For the sake of simplicity of the drawing, several parts are not shown in FIG. 2E, such as the quadrupole rods (112 in FIG. 2D).

The collision cell 10 of FIG. 2E is shown to comprise a body 115 in which vanes 114 are accommodated. The entrance aperture electrode 111 is constituted by a plate having an entrance aperture 116, while the exit aperture electrode 113 is constituted by a plate having an exit aperture 117. A gas inlet port 119 is shown to be located approximately in the middle of the collision cell 10. The gas inlet port 119 can be connected to a suitable gas supply.

The ion trajectory IT is shown to substantially coincide with the longitudinal direction LD of the collision cell 10. The ions enter the collision cell 10 through the entrance aperture 116 and leave through the exit aperture 117. The gas flow entering the collision cell is shown to split in substantially two partial flows: a first partial gas flow G1 flowing from the gas port 119 to the entrance aperture 116 (to the left in FIG. 2E) and a second partial gas flow G2 flowing from the gas port 119 to the exit aperture 117 (to the right in FIG. 2E). The first partial gas flow G1 and the ion stream therefore have opposite directions. As a result, the first partial gas flow G1 reduces the kinetic energy of the ions entering the collision cell. The second partial gas flow G2, on the other hand, has the same direction as the ion stream and therefore increases the kinetic energy of the ions.

It is noted that the entrance and exit apertures are small, to limit the gas flow through these openings and to maintain the desired pressure within the collision cell. In an exemplary embodiment, the entrance aperture 116 has a diameter of 3 mm while the exit aperture 117 has a diameter of 2 mm. It will be understood that the invention is not limited to these diameters and that the entrance aperture 116 may have a diameter in a range of, for example, approximately 1.5 to 6 mm, or approximately 2 to 4 mm. Similarly, the exit aperture 117 may have a diameter in a range of, for example, approximately 1 to 4 mm. At least part of the first partial gas flow G1 will flow through the entrance aperture and leave the collision cell. In some embodiments 100% of the first partial gas flow G1 may flow through the entrance aperture 116, in other embodiments less than 100%, for example 90% or 60%, if other openings are present in or near the entrance electrode.

In FIG. 2F, the electric field distributions produced by the vanes (114 in FIG. 2E) and the exit electrode (113 in FIG. 2E) in a first time period are schematically shown. Any electric field distribution produced by the entrance electrode (111 in FIG. 2E) is not shown in FIG. 2F, but this electric field may have a low or even negative value to attract positive ions. The axial DC electric field $E_{AX1}$ is shown to increase in the direction of the ion trajectory IT, thus decreasing the kinetic energy of positive ions. At the end of the vanes closest to the exit electrode (113 in FIG. 2E), the electric field $E_{AX1}$ reaches a value $E_1$. The exit electrode produces a DC electric field $E_{EX1}$ having a value $E_2$, which is greater than $E_1$ so as to trap ions near the exit aperture (117 in FIG. 2E).

In FIG. 2G, the electric field distributions produced by the vanes (114 in FIG. 2E) and the exit electrode (113 in FIG. 2E) in a second time period are schematically shown. Any electric field distribution produced by the entrance electrode (111 in FIG. 2E) is not shown in FIG. 2G. The axial DC electric field $E_{AX2}$ is shown to increase in the direction of the ion trajectory IT, thus decreasing the kinetic energy of positive ions. At the end of the vanes closest to the exit electrode (113 in FIG. 2E), the electric field $E_{AX2}$ reaches a value $E_3$ which is greater than the maximum value $E_2$ reached by the field $E_{AX1}$ in FIG. 2F. This greater value $E_3$, which results in a greater electric field gradient, serves to reduce the number of incoming ions while the trapped ions are being purged. This purging is achieved by lowering the electric field produced by the exit electrode to a low (or even negative) value $E_4$.

The removal of interferences can be tunable by adjusting the magnitude of the axial field gradient in the collision cell for successive ion injection (trapping) events so that the drag force and axial field gradient force are optimized to separate an analyte ion of interest from an interference ion. The magnitude of the axial field gradient in the collision cell during the trapping periods can thus be adjusted in dependence on the m/z of ions being analyzed downstream of the collision cell.

At any time during operation, the collision cell can be switched for a period of time to a conventional pass-through mode, i.e. without the injection (trapping) and release events. For example, when analyzing a region of the m/z spectrum which does not have ions which could possibly interfere, the first DC electric field distribution for trapping ions can be switched off and thus does not need to be followed by the second DC electric field distribution for releasing trapped ions either. A DC electric field distribution can be absent during the pass-through mode. In some embodiments, in the pass-through mode an accelerating (in the forward direction) DC axial field gradient could be applied in the collision cell. In embodiments comprising a mass analyzer downstream of the collision cell, such as the embodiment shown in FIG. 1 for example with a quadrupole mass analyzer 16, where the mass analyzer scans across an m/z region to provide a mass spectrum, the collision cell mode (trapping/releasing mode or pass-through mode) can be switched depending on the m/z being analyzed at that time.

Figure 3:
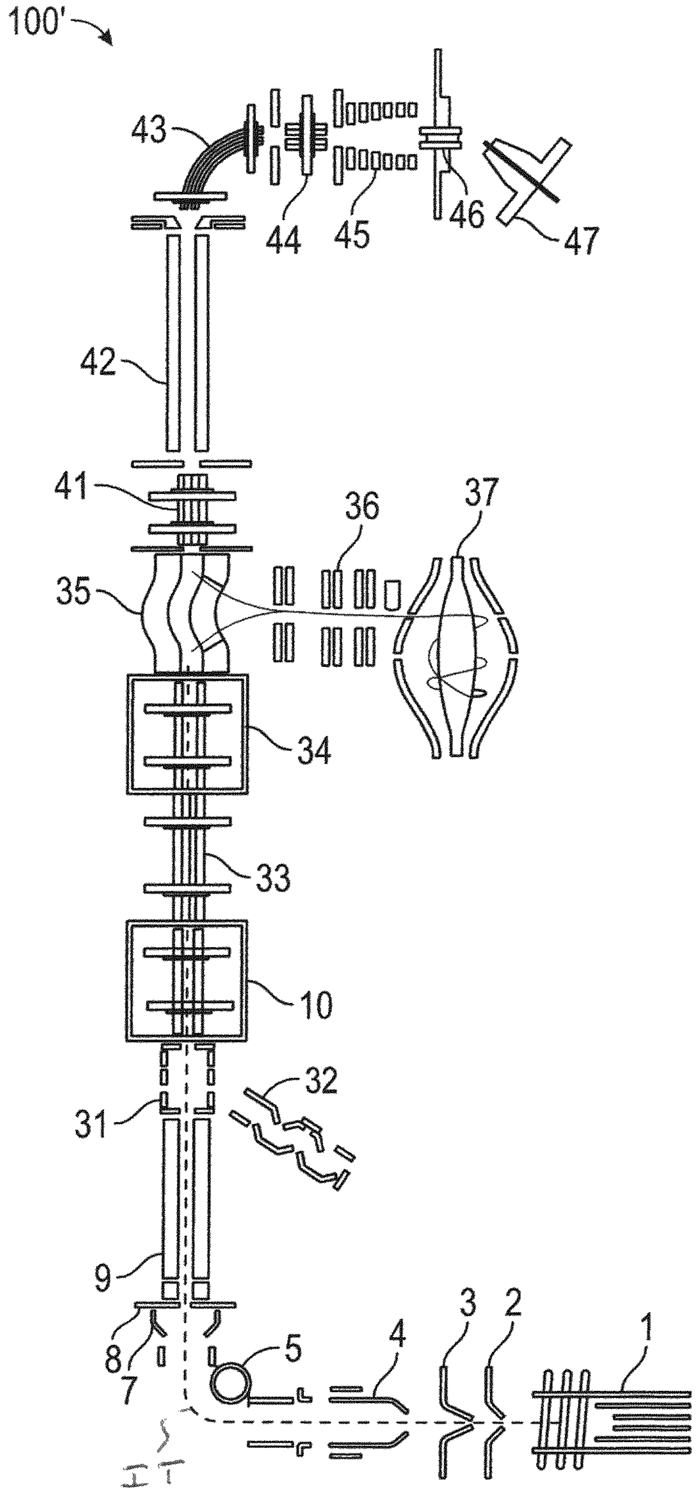
FIG. 3 schematically illustrates a second exemplary embodiment of a mass spectrometer according to the present invention.

FIG. 3 schematically shows an exemplary embodiment of a hybrid ICP—Orbitrap™ mass spectrometer (as produced by Thermo Fisher Scientific, Bremen, Germany), which was also employed in these studies. This instrument has a dual detection system, so that signals are independently acquired with a secondary electron multiplier (SEM) or an image charge detection circuitry (on the Fourier transform mass spectrometer side). As depicted, the ICP interface was coupled to a Q Exactive™ Plus Orbitrap™ mass spectrometer through the back flange, so that ICP-generated ions were introduced into the Orbitrap™ mass spectrometer through the higher-energy collisional dissociation (HCD) cell, as shown in FIGS. 2A and 2B. The HCD cell was operated in the trapping mode and had independently controlled axial field.

The mass spectrometer 100' of FIG. 3 comprises an ICP ion source 1, a sampling cone 2, a skimmer cone 3, ion extraction optics 4, an angular deflection assembly 5, a preselection quadrupole focus lens 7, a preselection quadrupole entry aperture 8, a preselection quadrupole 9, as in the mass spectrometer 100 of FIG. 1. The mass spectrometer 100' of FIG. 3 further comprises a rebounding lens 31, which enables either ion transmission to an Orbitrap™ analyser or ion reflection toward a SEM (secondary electron multiplier) detector 32. The HCD (higher-energy collisional dissociation) cells 10 and 34 may be identical to the collision cell 10 of the embodiment of FIG. 1. In accordance with the invention, the HCD cell 10 can be used as a CRC with a mass flow controller and different collision gases. A transfer octupole 33 can transfer ions to a further HCD cell 34 associated with an Orbitrap™ analyser 37. From the HCD cell 34, ions can be transferred to a C-trap 35 from where they are ejected to travel via a Z-lens 36 into the Orbitrap™ analyser 37 for mass analysis. In experiments with the ICP ion source, the analytes were injected and trapped in the HCD cell 34 of the Orbitrap™ analyser 37, transferred to the C-trap 35 and then further purged through the electrostatic lens (Z-lens) assembly 36 to the Orbitrap™ analyser 37 for signal analysis and detection.

An electrospray ionisation (ESI) source 47, a heated capillary 46, an S-lens 45, an inject flatapole 44, a bent flatapole 43, a further analytical quadrupole 42 and a transfer octupole 41 are provided to analyses biomolecular species, for example. The transfer octupole 41 is coupled to the C-trap 35, so that the HCD cell 34, the Z-lens 36 and the Orbitrap™ analyser 37 can be shared by the ESI-generated and ICP-generated ions.

Figure 4A:
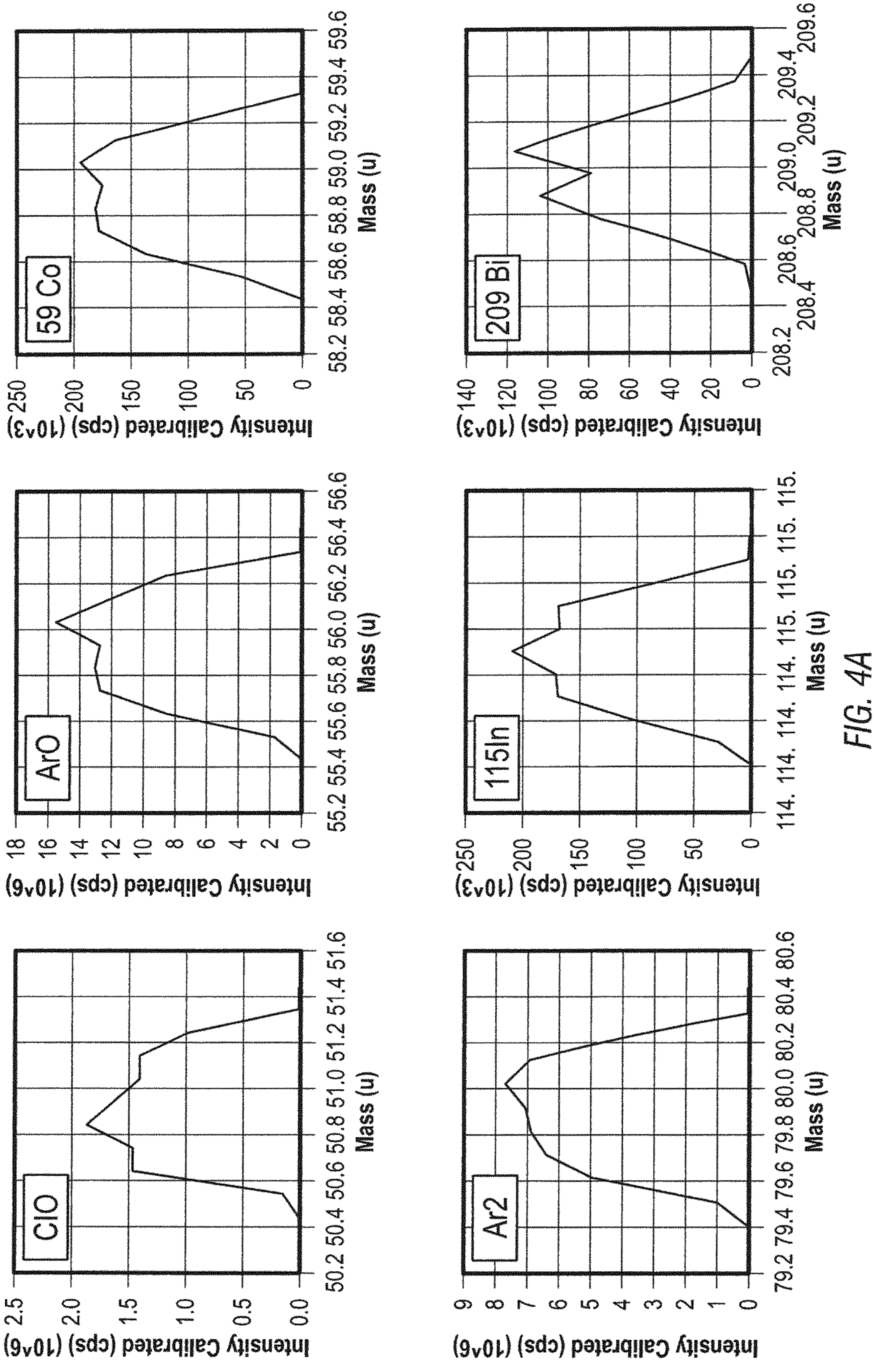
FIGS. 4A & 4B schematically illustrate IPC-MS spectra obtained with a triple quadrupole mass spectrometer in accordance with the prior art.

FIG. 4A shows typical ICP-MS spectra obtained using a standard configuration of a triple-quadrupole MS instrument when no gas is introduced into the collision cell. The vertical axes, which are labelled "Intensity Calibrated (cps) ($10^6$)", indicate the (calibrated) intensity of the spectra measured in counts per second (cps), while the horizontal axes, labelled "Mass (u)", indicate the mass in unified atomic mass units or Dalton. As can be seen in FIG. 4A, the peaks labelled as ClO (top left), $ArO^+$ (top middle) and $Ar_2^+$ (bottom left) are due to the most pronounced interferences of $ClO^+$, $ArO^+$ and $Ar_2^+$, respectively, detected in a 2% $HNO_3$ ICP-MS tune solution with 0.5% HCl. In addition, signals of $^{59}Co$, $^{116}In$ and $^{209}Bi$ are illustrated. The analytes shown were present in the tune solution at concentrations of 1±0.05 μg/l, or 1 ppb.

Figure 4B:
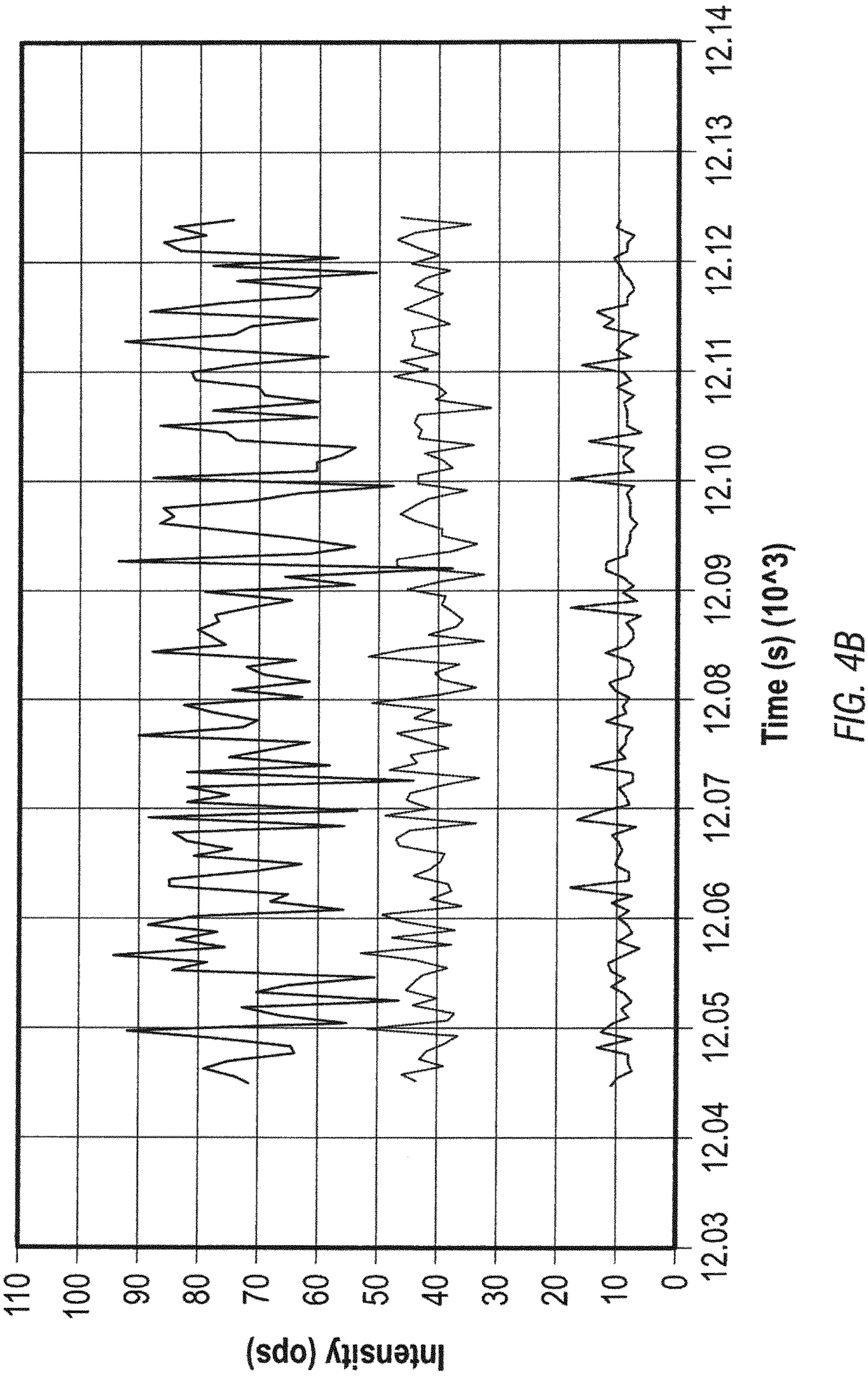

FIG. 4B shows time-domain signal traces of the ratios of $ClO^+/Co^+$ (bottom), $Ar_2^+/Co^+$ (middle) and $ArO^+/Co^+$ (top). The vertical axis indicates the intensity (cps), while the horizontal axis represents the time in thousands of seconds (i.e. kiloseconds). On average, these intensity ratios are 10, 40 and 75, respectively.

Figure 5A:
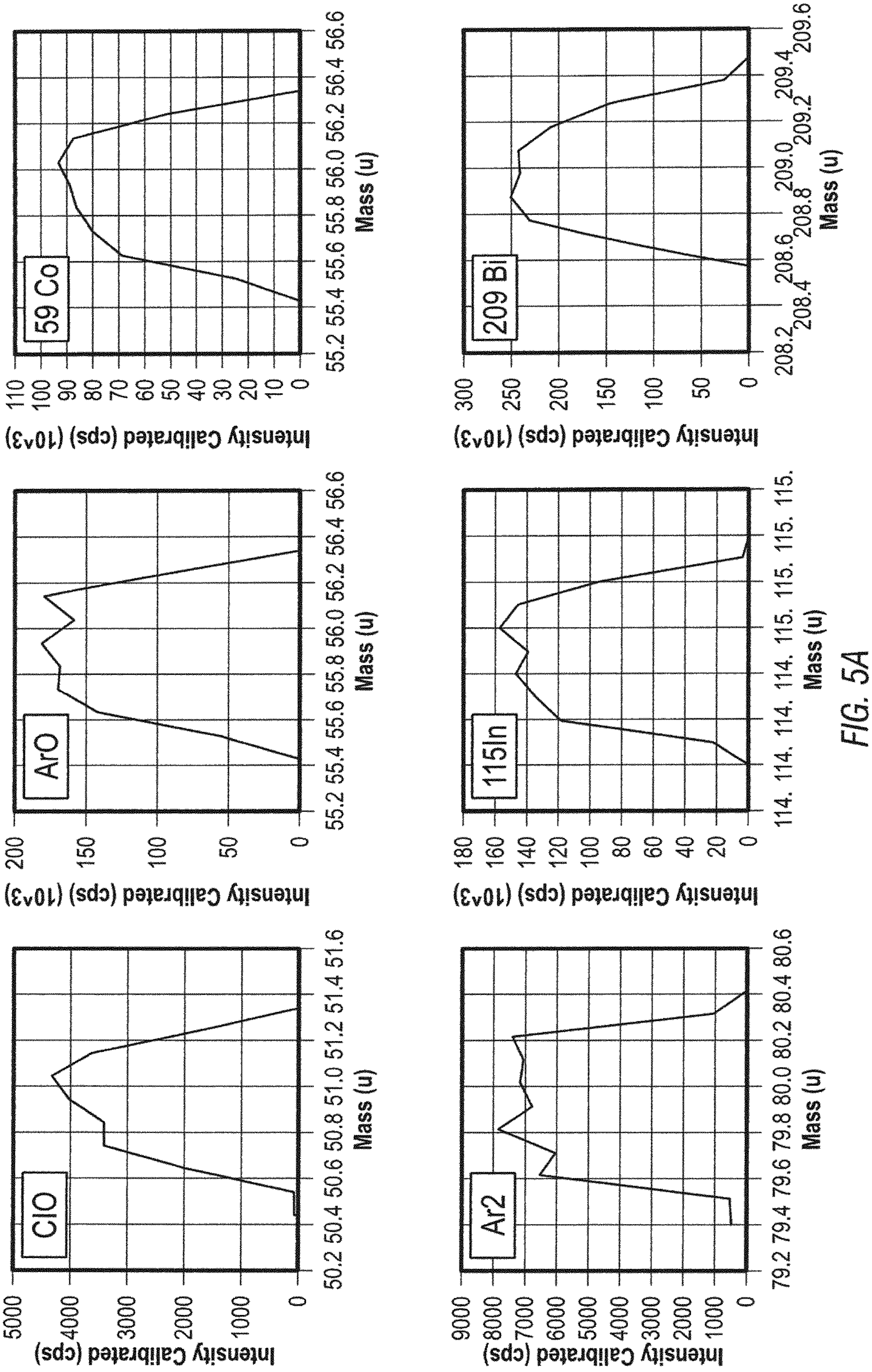
FIGS. 5A & 5B schematically illustrate IPC-MS spectra obtained with a triple quadrupole mass spectrometer in accordance with the present invention.

FIG. 5A shows ICP-MS signals of the same components as in FIG. 4A under the interference suppression conditions of the invention. The CRC was filled with helium at a flow rate of 12 ml/min and operated in the trapping mode. An axial field gradient of approximately 0.2 V/mm was introduced along the length of the collision cell. Each trapping event encompassed an injection time of 2 ms followed by a 0.1 ms purge (release) time. The trapping waveform was run asynchronously with the quadrupole operation at a repetition rate of 500 Hz.

Figure 5B:
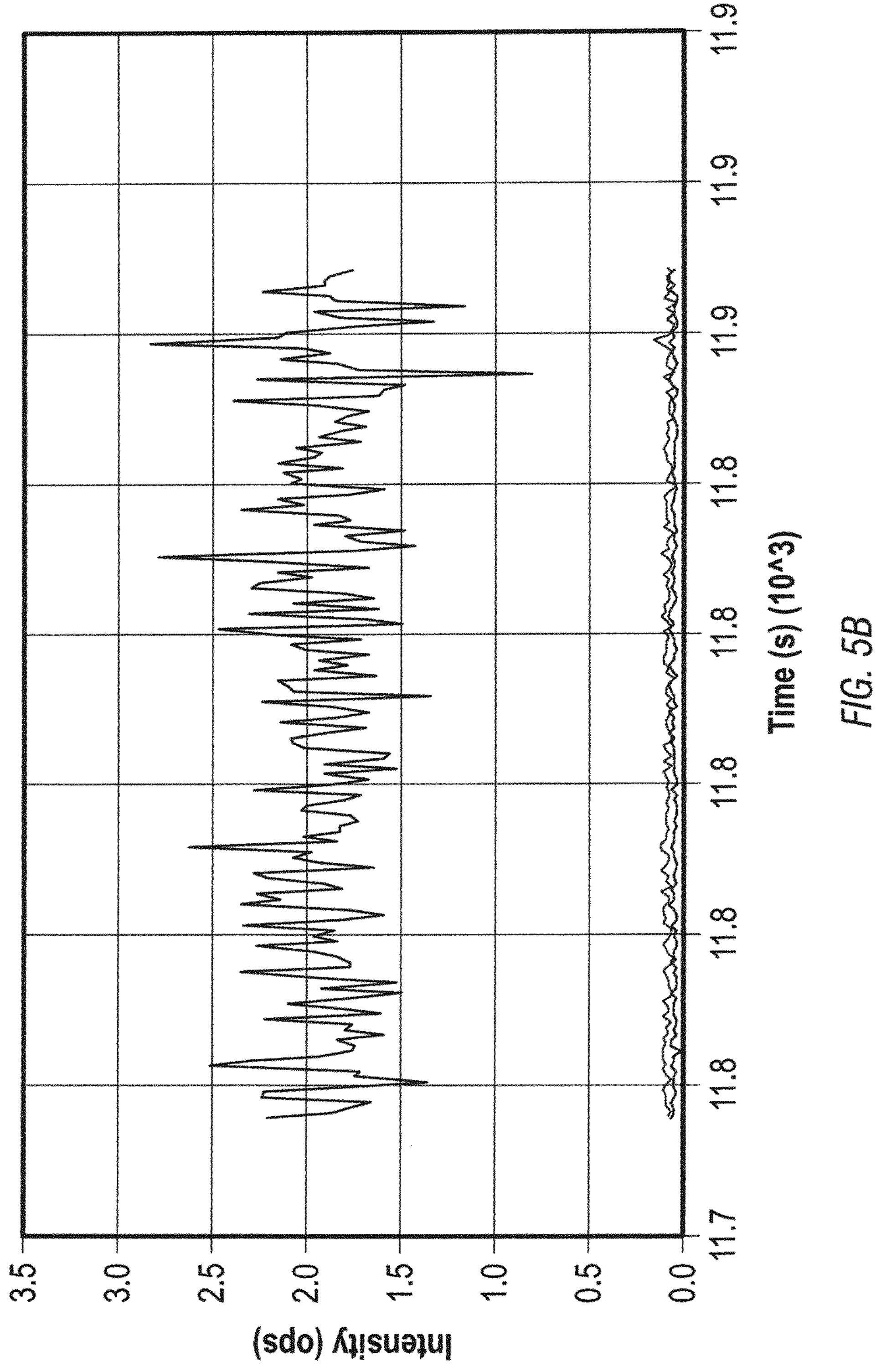

FIG. 5B shows the time domain representations of signal ratios of the matrix ions to $Co^+$ in the interference suppression mode. The same matrix species as in FIG. 4B were selected for analysis. Helium gas filled into the CRC at a flow rate of 12 ml/min and an electric field of 0.2 V/mm is applied along the CRC axis. As illustrated in FIG. 5B, on average, the ratios of interferences to $Co^+$ have drastically reduced to 0.04, 0.08 and 1.8 for $ClO^+$, $Ar_2^+$, $ArO^+$, respectively. As mentioned above, these ratios were 10, 40 and 75, respectively. This constitutes interference suppression by factors of 250, 500 and 40, respectively.

In the interference suppression mode, the analytical signals show different trends. For example, the $Co^+$ signal decreases by 40 to 50%, while the $Bi^+$ signal increases by 250%. At the same time, $ClO^+$, $Ar_2^+$ and $ArO^+$ interference signals decrease by over 100-fold. In other words, while the analytical signals may increase or decrease due to the interference suppression, the interference signals are significantly decreased, much more than any analytical signal.

Figure 6A:
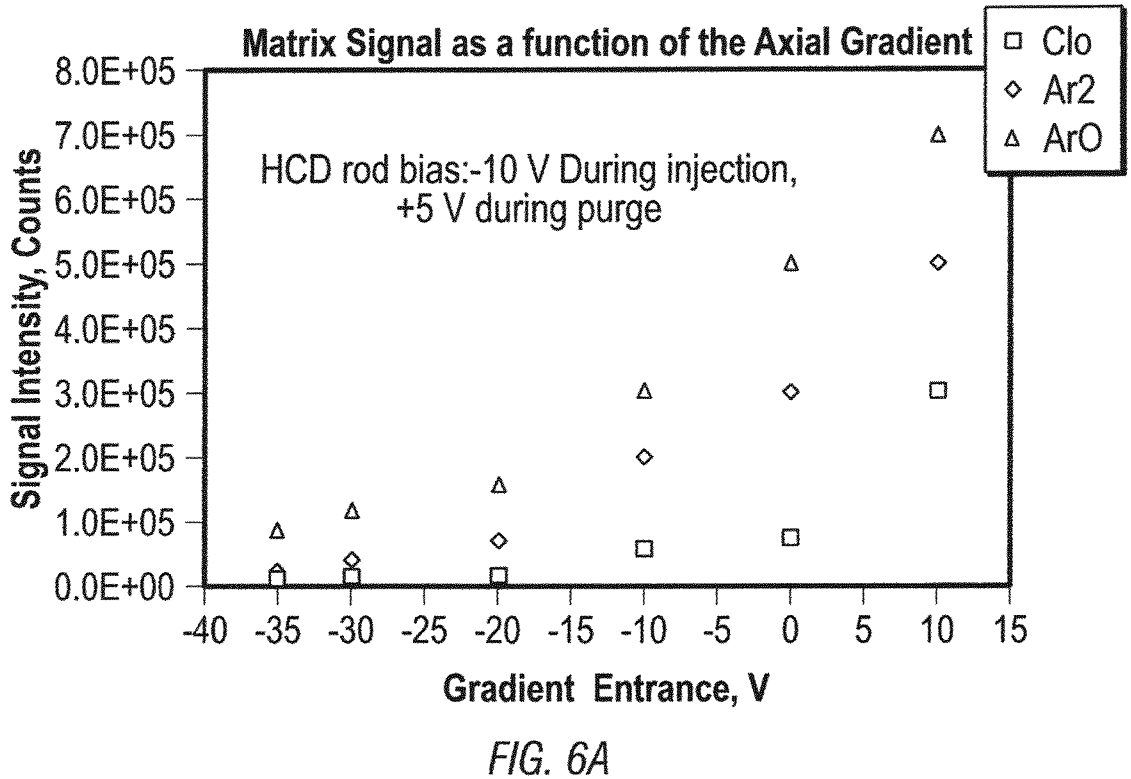
FIGS. 6A & 6B schematically illustrate matrix signals as a function of the axial gradient voltage in accordance with the prior art and in accordance with the present invention respectively.
Figure 6B:
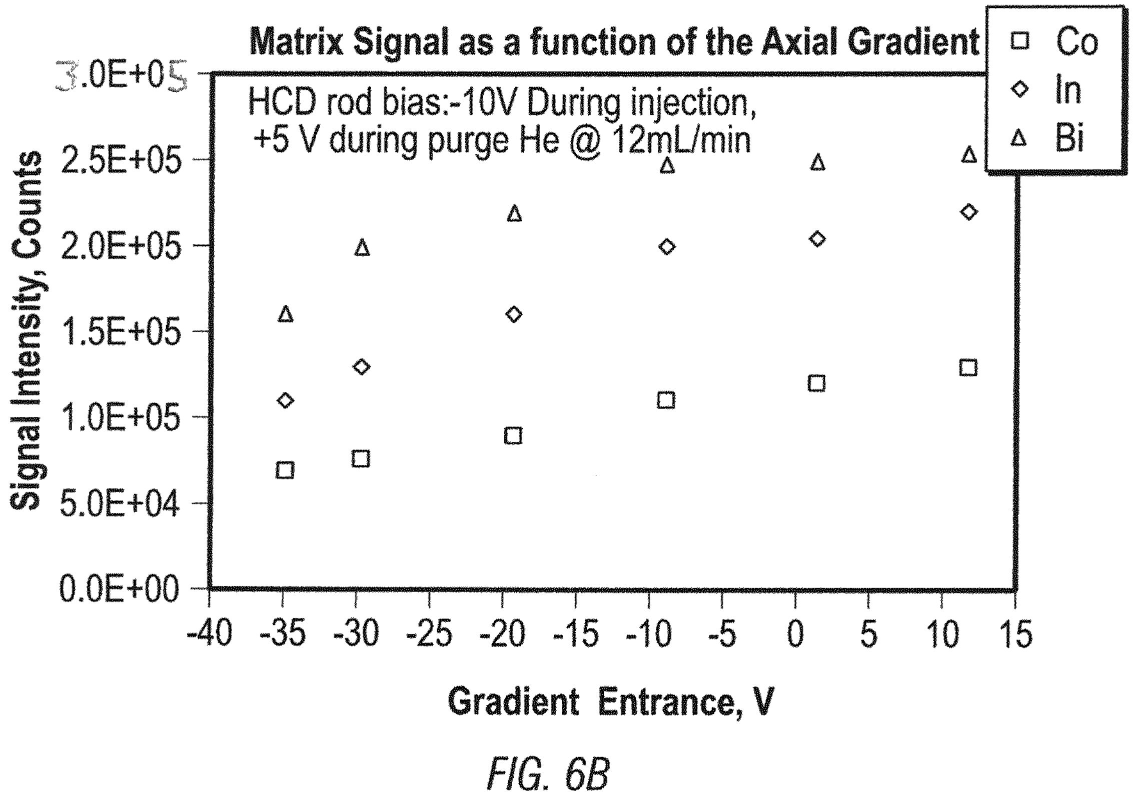

FIGS. 6A & 6B show the dependences of both the matrix (FIG. 6A) and analyte (FIG. 6B) signals on the axial gradient. More in particular, they show the detection signal intensity expressed in counts (vertical axis) as a function of the gradient entrance potential expressed in volts (horizontal axis) in two experiments, one with and one without a gas flow. The gradient entrance or gradient entrance voltage is the voltage at the first or entrance electrode of the vanes. The rods or RF axial electrodes of the collision cell (here referred to as HCD) had a bias of −10 V during the injection event (first time period) and +5 V during the purge or release event (second time period) in both experiments. The results of FIG. 6B were obtained using a helium gas flow of 12 ml/min. In FIG. 6A, the scale on the vertical (signal intensity) axis is from 0 to $8.0\times10^5$, while in FIG. 6B the scale is from 0 to $3.0\times10^5$.

The results indicate that while matrix signal suppression exhibits a 2-3 orders of magnitude effect at increased negative axial gradients, the analyte signals decrease only by 30-50%. This enhancement in the ratios of the analyte to matrix signals is attributed to the drag force effect, which is proportional to the collision cross section of the species of interest. Due to higher collisional cross sections of the matrix species than that of their analyte counterparts of the same or similar m/z, the matrix ions experience more pronounced deceleration in the CRC section located upstream of the gas introduction port. As a result, the matrix ions are no longer efficiently accumulated in the downstream section of the CRC cell operating in the trapping mode, evidenced in the drastic decrease of polyatomic interferences as compared to the standard transmission mode.

Figure 7A:
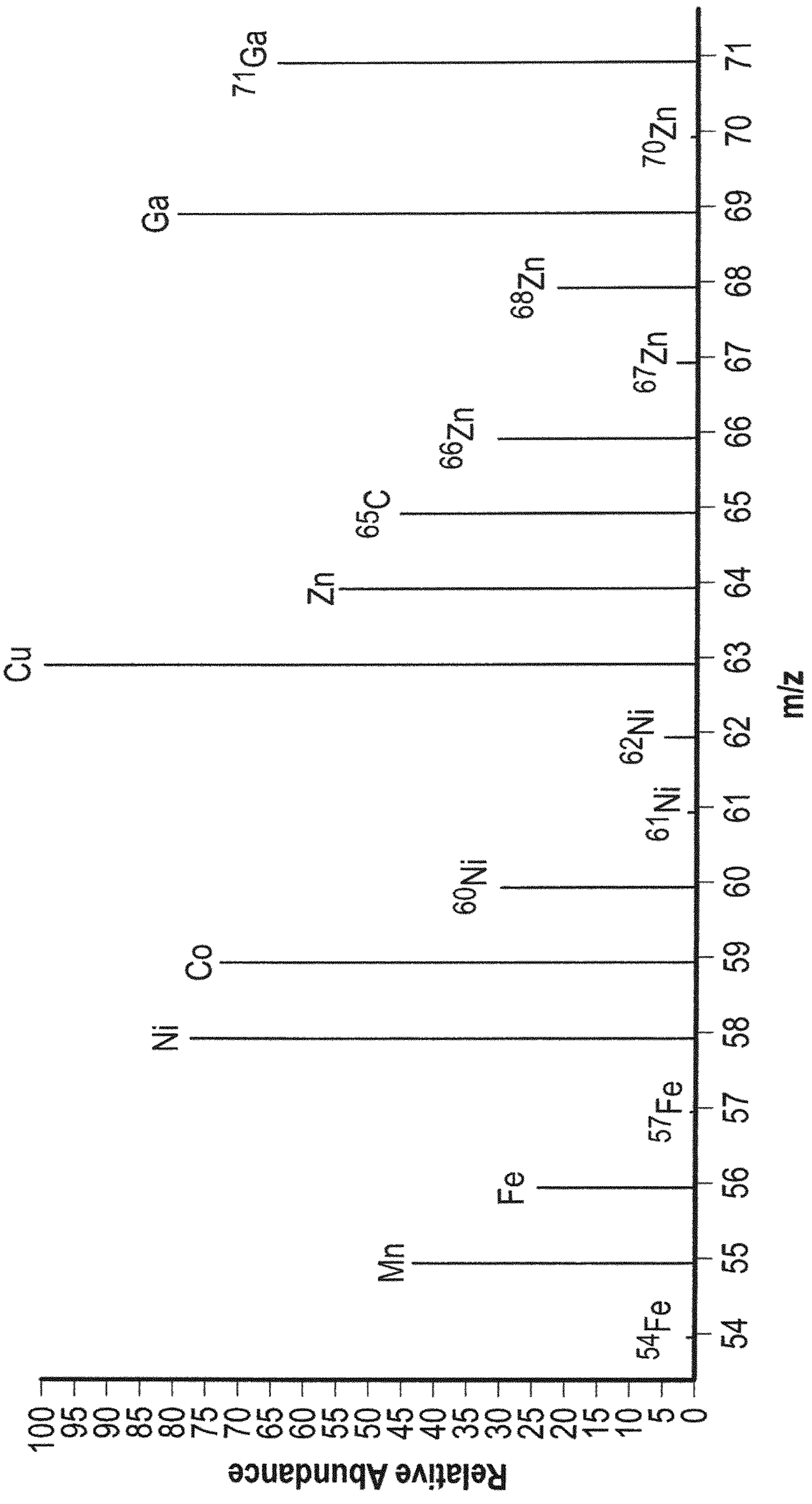
FIGS. 7A & 7B schematically illustrate two regions of a mass spectrum obtained in accordance with the present invention.
Figure 7B:
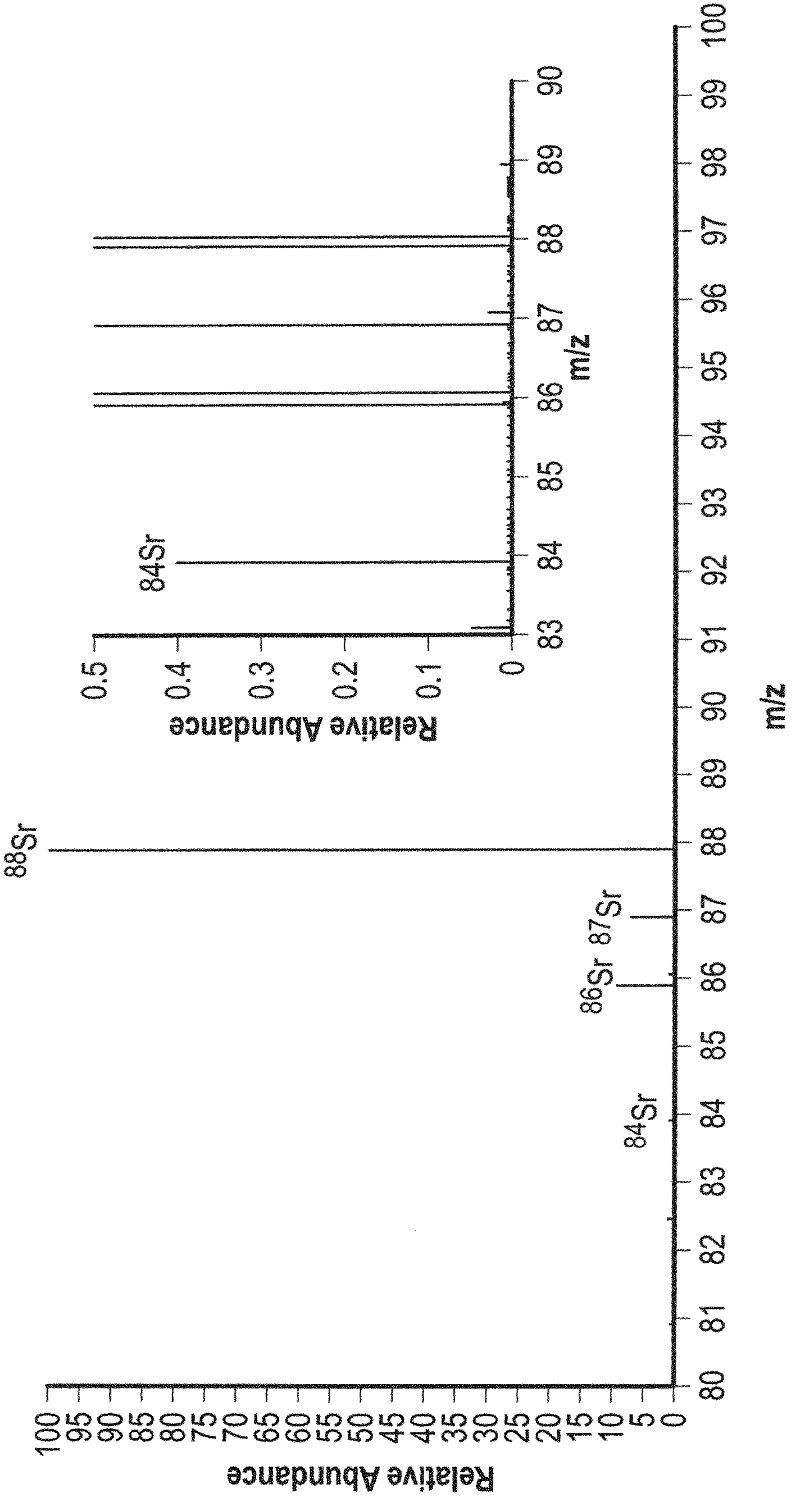

FIGS. 7A & 7B show two regions of a high-resolution mass spectrum, showing the relative abundance of ions on the vertical axis and the m/z (mass to charge) ratio on the horizontal axis. The mass spectrum was obtained with an ICP-Orbitrap™ mass spectrometer of the type shown in FIG. 3 while using a setup 2% $HNO_3$ solution, which contains 25 elements at concentrations ranging from 3 ppb to 30 ppb. Prior to injection into the Orbitrap™ analyzer, ICP-generated ions were trapped in the higher-energy collision cell (HCD) filled with nitrogen ($N_2$) before being release to the C-trap for injection into the Orbitrap™ mass analyser. The HCD was operated at a linear field gradient of 0.5 V/mm. The spectrum reveals a complete suppression of $ArO^+$ and $Ar_2^+$ matrix ions. The ejection of the ions from the C-trap into the Orbitrap™ mass analyser at high energy (e.g. 1 to 5 kV, or approximately 3 to 4 kV) may have an additional enhancing effect on removal of molecular interference ions. Another aspect of the invention thus comprises transferring ions from an ICP ion source, whether or not via a collision cell as described herein, to an ion trap (e.g. a linear ion trap, such as a C-trap) and ejecting the trapped ions from the ion trap into a mass analyser, e.g. with an ejection energy of 1 to 10 kV or 1 to 5 kV, or approximately 3 or 4 kV.

The measurement data of FIGS. 7A and 7B are presented in the tables below.

FIG. 7A:

| m/z | R | element | ppm |
|---|---|---|---|
| 53.9391 | 131542 | $^{54}Fe$ | 0.8245 |
| 54.9375 | 136127 | Mn | 0.4408 |
| 55.9344 | 138703 | Fe | 0.1577 |
| 56.9348 | 137775 | $^{57}Fe$ | −0.1867 |
| 57.9348 | 137433 | Ni | −0.4012 |
| 58.9326 | 135795 | Co | −0.7537 |
| 59.9302 | 135773 | $^{60}Ni$ | −0.5494 |
| 60.9305 | 124935 | $^{61}Ni$ | −0.6270 |
| 61.9278 | 130341 | $^{62}Ni$ | −0.3567 |
| 62.9290 | 131781 | Cu | −0.8007 |
| 63.9286 | 129194 | Zn | −0.5055 |
| 64.9272 | 129576 | $^{65}C$ | −0.7591 |
| 65.9255 | 130075 | $^{66}Zn$ | −0.3104 |
| 66.9265 | 118371 | $^{67}Zn$ | −0.6645 |
| 67.9243 | 127867 | $^{68}Zn$ | −0.2676 |
| 68.9250 | 127422 | Ga | −0.6279 |
| 69.9247 | 120593 | $^{70}Zn$ | −0.9666 |
| 70.9241 | 126064 | $^{71}Ga$ | −0.4943 |

FIG. 7B:

| m/z | R | element | ppm |
|---|---|---|---|
| 83.9129 | 106691 | $^{84}Sr$ | 0.1802 |
| 85.9087 | 105650 | $^{86}Sr$ | 0.1509 |
| 86.9084 | 107468 | $^{87}Sr$ | 0.6240 |
| 87.9051 | 111802 | $^{88}Sr$ | 0.3380 |
| 83.9129 | 106691 | $^{84}Sr$ | 0.1802 |

Figure 8:
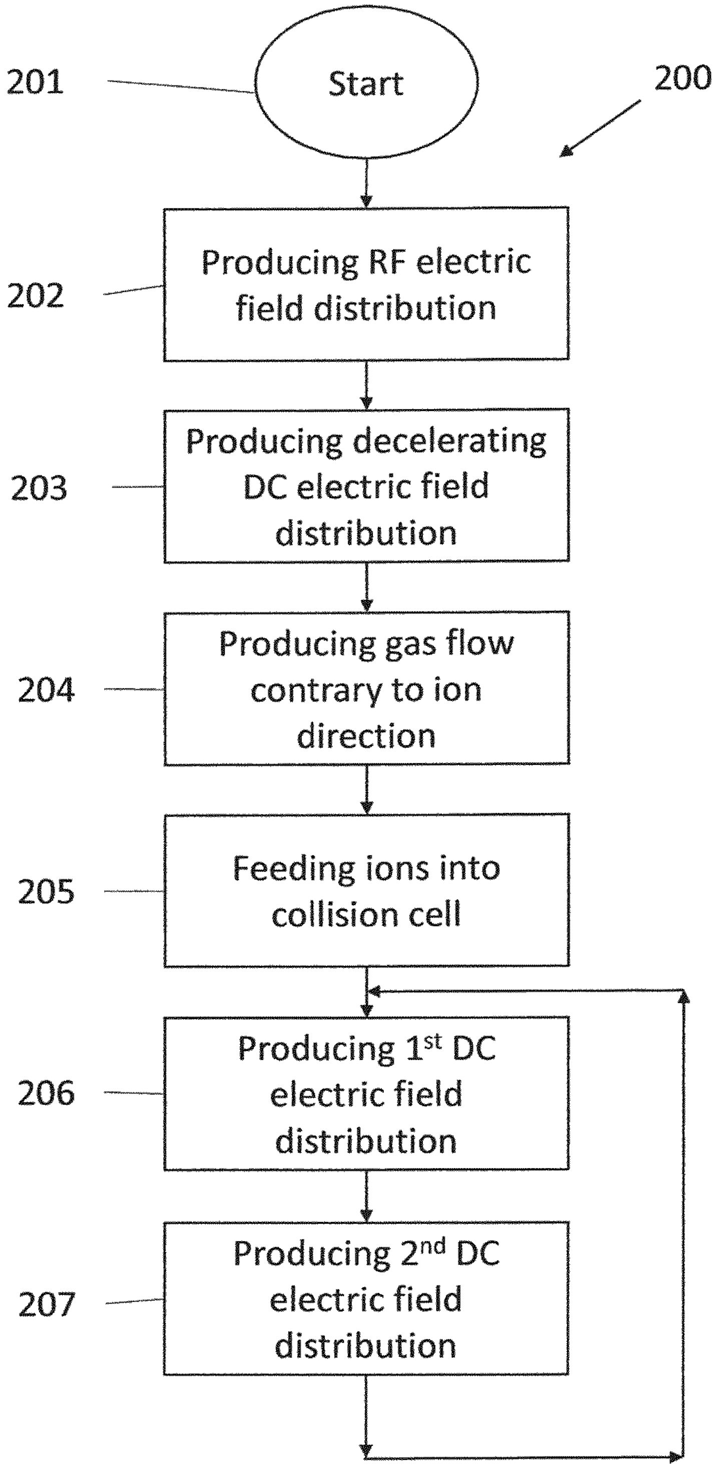
FIG. 8 schematically illustrates an embodiment of a method of operating a collision cell according to the present invention.

An exemplary embodiment of a method of operating a collision cell according to the present invention is schematically illustrated in FIG. 8. The method 200 starts at step 201 in which the method is initiated. In step 202, an axial RF field is generated for constraining ions, for example by using the pair or pairs of RF axial electrodes.

In step 203, a DC electrical field distribution is produced which is arranged to reduce the kinetic energy of the ions and thereby to decelerate the ions. The decelerating DC electrical distribution may be produced by using at least one DC axial electrode but preferably several, for example two, four, six or eight DC axial electrodes.

In step 204, a gas flow is generated through the collision cell, the gas flow being a counterflow over at least part of the length of the collision cell, for example over approximately half the length of the collision cell.

In step 205, ions are fed into the collision cell in a forward direction, the gas counterflow being in a backward direction. That is, the forward direction in which ions are fed into the collision cell and the gas counterflow direction are opposite directions.

In step 206, a first DC electric field distribution is produced so as to trap ions in the collision cell. In step 207 a second DC electric field distribution is produced so as to release trapped ions from the collision cell in the forward direction. The method may return to step 206, in which a trapping field is generated. That is, the trapping step 206 and the releasing step 207 may be repeated over a longer period of time.

It is noted that the listing of steps in the method claims need not imply a time sequence, as some steps may be carried out simultaneously, overlap at least partially in time (e.g. steps 202, 203, 204, 205, and 206 or 207) or may be carried out in another order than described. For example, the RF field producing steps 202, the gas producing step 204 and the ions feeding step 205 may be carried out in a different order or substantially simultaneously. The ions feeding step 205 may be carried out only after the trapping field producing step 206 has started. While the RF field producing steps 202, the gas producing step 204 and the ions feeding step 205 may be carried out continuously, the trapping step 206 and the releasing step 207 can be carried out alternatingly.

The gas flow may comprise a gas which is non-reactive with the ions. In some embodiments, the gas flow may entirely consist of a gas which is non-reactive with the ions, but in other embodiments the gas flow may include at least one other gas, which may or may not be non-reactive. The gas which is non-reactive with the ions may be an inert gas, such as helium.

It is noted that the present invention is in particular applicable to single atom analytes (that is, elemental ions), and especially in inductively coupled plasma mass spectrometry (ICP-MS) applications. The invention is most effective, but not limited to, the suppression of polyatomic interferences in the presence of single atom analytes. Accordingly, in the method of the present invention the ions received by the collision cell may originate from a plasma source and may comprise atomic ions and polyatomic ions. Polyatomic interferences that can be suppressed by the method and devices according to the present invention can include one or more of the following polyatomic ions that typically originate from a plasma ion source and/or from common sample matrices: $Ar_2^+$, $ArO^+$, $ArH^+$, $ClO^+$.

Certain embodiments of the invention may be summarized in the following clauses:

1. A method of operating a collision cell in a mass spectrometer, the collision cell comprising an entrance aperture, an exit aperture, at least one DC exit electrode and at least one pair of RF axial electrodes, the method comprising:
   feeding ions in a forward axial direction through the entrance aperture into the collision cell,
   producing, using the at least one pair of RF axial electrodes, an RF electric field distribution for radially confining the ions,
   producing, during a first time period and using the at least one DC exit electrode, a first DC electric field distribution for trapping ions in the collision cell,
   producing, during a second time period and using the at least one DC exit electrode, a second DC electric field distribution for releasing trapped ions in the forward axial direction towards the exit aperture, and
   producing in the collision cell a gas flow which is, at least near the entrance aperture, contrary to the forward axial direction, so as to separate ions in dependence on their collisional cross sections.
2. The method according to clause 1, wherein the collision cell further comprises at least one DC axial electrode, the method further comprising:
   producing, using the at least one DC axial electrode, a further DC electric field distribution having an axial field gradient for modulating the kinetic energy of ions entering the collision cell through the entrance aperture.
3. The method according to clause 2, wherein the axial field gradient is arranged for reducing the kinetic energy of the ions entering the collision cell.
4. The method according to clause 3, wherein the axial electric field gradient is greater during the second time period than during the first time period.
5. The method according to clause 3 or 4, wherein the further DC electric field distribution is only produced when the gas flow has a flow rate which is lower than a threshold value, the threshold value preferably being between 8 ml/min and 12 ml/min, more preferably approximately 10 ml/min.
6. The method according to clause 2, wherein the axial field gradient is arranged for increasing the kinetic energy of the ions entering the collision cell.
7. The method according to clause 6, wherein the axial electric field gradient is smaller during the second time period than during the first time period.
8. The method according to clause 6 or 7, wherein the further DC electric field distribution is only produced when the gas flow has a flow rate which is higher than a threshold value, the threshold value preferably being between 8 ml/min and 12 ml/min, more preferably approximately 10 ml/min.
9. The method according to any of the preceding clauses, wherein the gas flow at the entrance aperture has a flow rate of between 5 ml/min and 40 ml/min.
10. The method according to clause 9, wherein the flow rate is between 10 ml/min and 15 ml/min, preferably approximately 12 ml/min.
11. The method according to any of the preceding clauses, wherein the gas pressure in the collision cell is between 0.001 mbar and 0.1 mbar, preferably approximately 0.01 mbar.
12. The method according to any of the preceding clauses, wherein the gas flow flows contrary to the forward axial direction of the ions from at least one inlet port located between approximately one quarter and approximately three-quarters of the distance between the entrance aperture and the exit aperture, preferably from approximately halfway between the entrance aperture and the exit aperture.
13. The method according to any of clauses 1 to 11, wherein the gas flow flows from at least one inlet port located approximately at the exit aperture contrary to the forward axial direction of the ions.
14. The method according to any of the preceding clauses, wherein the gas flow comprises a gas which is non-reactive with the ions, preferably an inert gas, such as helium.

15. The method according to any of the preceding clauses, wherein the first time period is between 2 and 30 times longer than the second time period, preferably approximately 20 times longer.
16. The method according to clause 15, wherein the first time period has a duration of approximately 2 ms and the second time period has a duration of approximately 0.1 ms.
17. The method according to any of the preceding clauses, wherein the collision cell comprises two pairs of RF axial electrodes constituting a quadrupole arrangement, and wherein the method comprises producing, using the quadrupole arrangement, the RF electric field distribution for radially confining the ions.
18. The method according to any of the preceding clauses, wherein the collision cell comprises three or more pairs of RF axial electrodes constituting a hexapole, octupole or higher order arrangement, and wherein the method comprises producing, using the hexapole, octupole or higher order arrangement, the RF electric field distribution for radially confining the ions.
19. The method according to any of the preceding clauses, wherein the ions originate from a plasma source and comprise atomic ions and polyatomic ions.
20. A method of mass spectrometry comprising:
    generating ions in a plasma ion source,
    transporting the ions to a collision cell, and
    operating the collision cell according to the method according to any of the preceding clauses,
    wherein producing a second DC electric field distribution causes ions to be ejected from the collision cell, the method further comprising:
    transporting the ejected ions to a mass analyzer, and
    mass analyzing the ions in the mass analyzer.
21. A collision cell for use in a mass spectrometer, the collision cell comprising:
    an entrance aperture for receiving ions in a forward axial direction,
    an exit aperture for emitting ions in the forward axial direction,
    at least one DC exit electrode for producing, during a first time period, a first DC electric field distribution to trap ions and for producing, during a second time period, a second DC electric field distribution to release trapped ions in the forward axial direction towards the exit aperture,
    at least one pair of RF axial electrodes for producing an RF electric field distribution for radially confining ions, and
    at least one gas inlet port for receiving a gas flow which is, at least near the entrance aperture, contrary to the forward axial direction, so as to separate ions in dependence on their collisional cross sections.
22. The collision cell according to clause 21, further comprising at least one DC axial electrode for producing a further DC electric field distribution having an axial field gradient for modulating the kinetic energy of ions entering the collision cell through the entrance aperture.
23. The collision cell according to clause 22, wherein the at least one axial electrode has a resistance gradient, the resistance gradient preferably comprising a series arrangement of resistors.
24. The collision cell according to clause 22 or 23, wherein the axial field gradient is arranged for reducing the kinetic energy of the ions entering the collision cell.
25. The collision cell according to clause 24, arranged for producing a greater axial electric field gradient during the second time period than during the first time period.
26. The collision cell according to clause 24 or 25, arranged for only producing the further DC electric field distribution when the gas flow has a flow rate which is lower than a threshold value, the threshold value preferably being between 8 ml/min and 12 ml/min, more preferably approximately 10 ml/min.
27. The collision cell according to clause 21, wherein the axial field gradient is arranged for increasing the kinetic energy of the ions entering the collision cell.
28. The collision cell according to clause 27, arranged for producing a smaller axial electric field gradient during the second time period than during the first time period.
29. The method according to clause 27 or 28, arranged for only producing an electric field having an accelerating axial field gradient when the gas flow has a flow rate which is higher than a threshold value, the threshold value preferably being between 8 ml/min and 12 ml/min, more preferably approximately 10 ml/min.
30. The collision cell according to any of clauses 21 to 29, further comprising at least one gas source for providing a flow rate of the gas flow at the entrance aperture between 5 ml/min and 40 ml/min.
31. The collision cell according to clause 30, wherein the flow rate is between 10 ml/min and 15 ml/min, preferably approximately 12 ml/min.
32. The collision cell according to any of clauses 21 to 31, arranged to maintain a gas pressure between 0.001 mbar and 0.1 mbar, preferably approximately 0.01 mbar.
33. The collision cell according to any of clauses 21 to 32, wherein the at least one gas inlet port is arranged between approximately one quarter and three quarters of the distance between the entrance aperture and the exit aperture, preferably from approximately halfway between the entrance aperture and the exit aperture.
34. The collision cell according to any of clauses 21 to 33, wherein the at least one gas inlet port is arranged approximately at the exit aperture.
35. The collision cell according to any of clauses 21 to 34, wherein the gas flow comprises a gas which is non-reactive with the ions, preferably an inert gas, such as helium.
36. The collision cell according to any of clauses 21 to 35, wherein the at least one DC exit electrode is arranged near the exit aperture.
37. The collision cell according to any of clauses 21 to 35, wherein the at least one DC exit electrode defines the exit aperture.
38. The collision cell according to any of clauses 21 to 37, further comprising at least one voltage source for supplying electric field distributions generating voltages to the DC and RF electrodes.
39. A mass spectrometer, comprising at least one collision cell according to any of clauses 21 to 38.
40. The mass spectrometer according to clause 39, further comprising at least one ion source, such as a plasma ions source, at least one mass analyzer and at least one detector for detecting ions.
41. A kit-of-parts for providing a mass spectrometer, the kit-of-parts comprising:
    at least one ion source,
    at least one mass analyzer,
    at least one detector for detecting ions, and at least one collision cell according to any of clauses 21 to 38.

It will be understood by those skilled in the art that the invention is not limited to the embodiments described above and that many additions and modifications may be made without departing from the scope of the invention as defined in the appending claims.

The invention claimed is:

1. A method of operating a collision cell in a mass spectrometer, wherein the collision cell comprises an entrance aperture, an exit aperture, at least one DC exit electrode, at least one pair of RF axial electrodes and at least one DC axial electrode, the method comprising:

feeding ions in a forward axial direction through the entrance aperture into the collision cell, producing, using the at least one pair of RF axial electrodes, an RF electric field distribution for radially confining the ions, producing, during a first time period and using the at least one DC exit electrode, a first DC electric field distribution for trapping ions in the collision cell, producing, during a second time period and using the at least one DC exit electrode, a second DC electric field distribution for releasing trapped ions in the forward axial direction towards the exit aperture, producing in the collision cell a gas flow which is, at least near the entrance aperture, contrary to the forward axial direction, so as to separate ions in dependence on their collisional cross sections, and producing, using the at least one DC axial electrode, a further DC electric field distribution having an axial electric field for modulating the kinetic energy of ions entering the collision cell through the entrance aperture, wherein the strength of the axial electric field is selected based in part on a gas flow rate of the gas flow, wherein the axial electric field is arranged for reducing the kinetic energy of the ions entering the collision cell, and wherein the producing the gas flow is performed such that, in at least a portion of the collision cell, each of the gas flow and the axial electric field are directed to exert forces on the ions in a common direction to reduce the kinetic energy of the ions.

2. The method according to claim 1, wherein a magnitude of the axial electric field is greater during the second time period than during the first time period.

3. The method according to claim 1, wherein the gas pressure in the collision cell is between 0.001 mbar and 0.1 mbar.

4. The method according to claim 3, wherein the gas pressure in the collision cell is between 0.005 mbar and 0.02 mbar.

5. The method according to claim 1, wherein the gas flow at the entrance aperture has a flow rate of between 5 ml/min and 40 ml/min.

6. The method according to claim 5, wherein the flow rate at the entrance aperture is between 10 ml/min and 15 ml/min.

7. The method according to claim 1, wherein the further DC electric field distribution is only produced when the gas flow has a flow rate which is lower than a threshold value, the threshold value being between 8 ml/min and 12 ml/min.

8. The method according to claim 1, wherein the gas flow flows contrary to the forward axial direction of the ions from at least one inlet port located between approximately one quarter and approximately three-quarters of the distance between the entrance aperture and the exit aperture.

9. The method according to claim 1, wherein the gas flow flows from at least one inlet port located approximately at the exit aperture contrary to the forward axial direction of the ions.

10. The method according to claim 1, wherein the first time period is between 2 and 30 times longer than the second time period.

11. The method according to claim 10, wherein the first time period has a duration of approximately 2 ms and the second time period has a duration of approximately 0.1 ms.

12. The method according to claim 1, wherein the collision cell comprises two pairs of RF axial electrodes constituting a quadrupole arrangement, and wherein the method comprises producing, using the quadrupole arrangement, the RF electric field distribution for radially confining the ions.

13. The method according to claim 1, wherein the collision cell comprises three or more pairs of RF axial electrodes constituting a hexapole, octupole or higher order arrangement, and wherein the method comprises producing, using the hexapole, octupole or higher order arrangement, the RF electric field distribution for radially confining the ions.

14. The method according to claim 1, wherein the ions originate from a plasma source and comprise atomic ions and polyatomic ions, and wherein the strength of the axial electric field is further selected to cause the collision cell allow atomic ions of a desired m/z ratio to pass through the collision cell while rejecting the polyatomic ions of the desired m/z ratio.

15. The method according to claim 1, wherein the further DC electric field distribution is produced using the at least one DC axial electrode based on the gas flow rate of the gas flow being below a threshold value.

16. A collision cell for use in a mass spectrometer, the collision cell comprising:

an entrance aperture for receiving ions in a forward axial direction, an exit aperture for emitting ions in the forward axial direction, at least one DC exit electrode for producing, during a first time period, a first DC electric field distribution to trap ions and for producing, during a second time period, a second DC electric field distribution to release trapped ions in the forward axial direction towards the exit aperture, at least one pair of RF axial electrodes for producing an RF electric field distribution for radially confining ions, at least one gas inlet port for receiving a gas flow which is, at least near the entrance aperture, contrary to the forward axial direction, so as to separate ions in dependence on their collisional cross sections, and at least one DC axial electrode for producing a further DC electric field distribution having an axial electric field for modulating the kinetic energy of ions entering the collision cell through the entrance aperture, so as to reduce the kinetic energy of the ions entering the collision cell, wherein the strength of the axial electric field is selected based in part on a gas flow rate of the gas flow, and wherein the gas inlet port and the at least one DC axial electrode are configured such that, in at least a portion of the collision cell, each of the gas flow and the axial electric field are directed to exert forces on the ions in a common direction to reduce the kinetic energy of the ions.

17. The collision cell according to claim 16, wherein the at least one DC axial electrode has a resistance gradient, the resistance gradient comprising a series arrangement of resistors.

18. The collision cell according to claim 16, arranged for producing a greater axial electric field gradient magnitude during the second time period than during the first time period.

19. The collision cell according to claim 16, arranged to maintain a gas pressure between 0.001 mbar and 0.1 mbar.

20. The collision cell according to claim 16, further comprising at least one gas source for providing a flow rate of the gas flow at the entrance aperture between 5 ml/min and 40 ml/min.

21. The collision cell according to claim 20, wherein the flow rate at the entrance aperture is between 10 ml/min and 15 ml/min.

22. The collision cell according to claim 16, arranged for only producing the further DC electric field distribution when the gas flow has a flow rate which is lower than a threshold value, the threshold value being between 8 ml/min and 12 ml/min.

23. The collision cell according to claim 16, wherein the at least one gas inlet port is arranged between approximately one quarter and three quarters of the distance between the entrance aperture and the exit aperture.

24. The collision cell according to claim 16, wherein the at least one gas inlet port is arranged approximately at the exit aperture.

25. The collision cell according to claim 16, wherein the gas flow comprises a gas which is non-reactive with the ions.

26. The collision cell according to claim 16, wherein the at least one DC exit electrode is arranged near the exit aperture.

27. The collision cell according to claim 16, wherein the at least one DC exit electrode defines the exit aperture.

28. The collision cell according to claim 16, further comprising at least one voltage source for supplying electric field distributions generating voltages to the DC and RF electrodes.

29. A kit-of-parts for providing a mass spectrometer, the kit-of-parts comprising:

at least one ion source, at least one mass analyzer, at least one detector for detecting ions, and at least one collision cell having:

an entrance aperture for receiving ions in a forward axial direction, an exit aperture for emitting ions in the forward axial direction, at least one DC exit electrode for producing, during a first time period, a first DC electric field distribution to trap ions and for producing, during a second time period, a second DC electric field distribution to release trapped ions in the forward axial direction towards the exit aperture, at least one pair of RF axial electrodes for producing an RF electric field distribution for radially confining ions, at least one gas inlet port for receiving a gas flow which is, at least near the entrance aperture, contrary to the forward axial direction, so as to separate ions in dependence on their collisional cross sections, and at least one DC axial electrode for producing a further DC electric field distribution having an axial electric field for modulating the kinetic energy of ions entering the collision cell through the entrance aperture, so as to reduce the kinetic energy of the ions entering the collision cell, wherein the strength of the axial electric field is selected based in part on a gas flow rate of the gas flow, wherein the gas inlet port and the at least one DC axial electrode are configured such that, during operative use of the mass spectrometer, each of the gas flow and the axial electric field are directed to exert forces on the ions in a common direction in at least a portion of the collision cell to reduce the kinetic energy of the ions.

* * * * *